(12) United States Patent
Fenwick et al.

(10) Patent No.: US 10,760,602 B2
(45) Date of Patent: Sep. 1, 2020

(54) SYSTEMS AND METHODS FOR CONNECTING A STRUCTURAL MEMBER TO A PILE

(71) Applicant: American Piledriving Equipment, Inc., Kent, WA (US)

(72) Inventors: Matthew E. Fenwick, Kent, WA (US); Gerald Cors, Enumclaw, WA (US)

(73) Assignee: AMERICAN PILEDRIVING EQUIPMENT, INC., Kent, WA (US)

( * ) Notice: Subject to any disclaimer, the term of this patent is extended or adjusted under 35 U.S.C. 154(b) by 459 days.

(21) Appl. No.: 15/174,724

(22) Filed: Jun. 6, 2016

(65) Prior Publication Data

US 2016/0356294 A1 Dec. 8, 2016

Related U.S. Application Data

(60) Provisional application No. 62/172,485, filed on Jun. 8, 2015.

(51) Int. Cl.
*F16B 5/02* (2006.01)
*E02D 5/28* (2006.01)
*E02D 5/56* (2006.01)

(52) U.S. Cl.
CPC .......... *F16B 5/02* (2013.01); *E02D 5/28* (2013.01); *E02D 5/56* (2013.01); *E02D 2600/20* (2013.01)

(58) Field of Classification Search
CPC .. E02D 5/54; E02D 5/72; E02D 5/223; E02D 35/005; F16C 11/0623; F16C 11/0695; F16C 11/106; F16B 7/14; F16B 7/182; F16B 2/065; F16B 2/12; F16B 2200/506; F16B 2200/509; Y10T 403/32491;
(Continued)

(56) References Cited

U.S. PATENT DOCUMENTS

| 500,780 A | 7/1893 | Simon |
| 598,221 A * | 2/1898 | Going .................. F16M 13/02 248/276.1 |

(Continued)

FOREIGN PATENT DOCUMENTS

| CA | 2394894 A1 | 8/2003 |
| CN | 102296608 B | 7/2015 |

(Continued)

OTHER PUBLICATIONS

USPTO, "Final Office Action, U.S. Appl. No. 15/285,326", dated Apr. 25, 2018, 9 pages.

(Continued)

*Primary Examiner* — Jonathan P Masinick
(74) *Attorney, Agent, or Firm* — Michael R. Schacht; Schacht Law Office, Inc.

(57) ABSTRACT

A connecting system for connecting a pile to a structural member has a core portion, a first interface portion, and a second interface portion. The core portion defines a system axis. The first interface portion defines a reference plane and is adapted to be connected to the core portion and the structural member. The second interface portion is adapted to be connected to the core portion and the pile. The second interface portion fixes a position of the system axis relative to the pile. The core portion allows adjustment of a position of the reference plane relative to the system axis.

22 Claims, 23 Drawing Sheets

(58) Field of Classification Search
CPC ....... Y10T 403/7077; Y10T 403/32631; Y10T 403/32803; Y10T 403/645; Y10T 403/648; Y10T 403/7069; Y10T 403/32311; Y10T 403/32319; F16M 11/14; F16M 11/2078
USPC ..... 405/230, 255; 403/109.4, 377, 122, 143, 403/337, 338, 374.4
See application file for complete search history.

(56) References Cited

U.S. PATENT DOCUMENTS

| | | | | |
|---|---|---|---|---|
| 813,318 | A * | 2/1906 | McCarthy | B66F 3/08 |
| | | | | 254/100 |
| 910,421 | A | 1/1909 | Schlueter | |
| 999,334 | A | 8/1911 | Pearson | |
| 1,684,816 | A | 9/1928 | Arden | |
| 1,829,964 | A * | 11/1931 | Randall | F16C 11/0619 |
| | | | | 403/38 |
| 2,101,285 | A | 12/1937 | Stevens | |
| 2,128,428 | A | 8/1938 | Murray, Jr. | |
| 2,232,845 | A | 2/1941 | Fieroh | |
| 2,504,291 | A * | 4/1950 | Alderfer | E04G 25/061 |
| | | | | 254/98 |
| 3,059,436 | A | 10/1962 | Hermann, Jr. | |
| 3,175,630 | A | 3/1965 | Hein et al. | |
| 3,204,898 | A * | 9/1965 | Manning | E04F 11/1812 |
| | | | | 248/516 |
| 3,411,305 | A | 11/1968 | Cella | |
| 3,470,663 | A * | 10/1969 | Tate Donald L | |
| | | | | E04F 15/02482 |
| | | | | 52/126.6 |
| 3,606,704 | A * | 9/1971 | Denton | E04F 15/024 |
| | | | | 52/167.8 |
| 3,655,161 | A * | 4/1972 | Schueler | E04G 25/06 |
| | | | | 254/100 |
| 3,713,259 | A * | 1/1973 | Tkach | E04B 1/0007 |
| | | | | 52/111 |
| 3,830,024 | A * | 8/1974 | Warnke | E04B 1/34347 |
| | | | | 52/23 |
| 3,852,970 | A * | 12/1974 | Cassidy | E02D 27/48 |
| | | | | 405/230 |
| 3,999,392 | A | 12/1976 | Fukushima et al. | |
| 4,188,681 | A * | 2/1980 | Tada | B23Q 1/5462 |
| | | | | 14/73.5 |
| 4,190,223 | A | 2/1980 | Swanson | F16L 3/16 |
| | | | | 248/354.3 |
| 4,209,868 | A * | 7/1980 | Tada | E01D 19/043 |
| | | | | 14/73.5 |
| 4,261,149 | A * | 4/1981 | Gustafson | E04B 1/34352 |
| | | | | 52/292 |
| 4,297,056 | A | 10/1981 | Nottingham | |
| 4,351,624 | A | 9/1982 | Barber | |
| 4,417,426 | A * | 11/1983 | Meng | E04B 1/34352 |
| | | | | 52/126.7 |
| 4,519,729 | A | 5/1985 | Clarke et al. | |
| 4,546,581 | A * | 10/1985 | Gustafson | E02D 27/34 |
| | | | | 52/126.6 |
| 4,581,863 | A * | 4/1986 | Thaler | E04D 13/1407 |
| | | | | 248/354.3 |
| 4,632,602 | A | 12/1986 | Hovnanian | |
| 4,738,061 | A * | 4/1988 | Herndon | E02D 27/02 |
| | | | | 52/126.6 |
| 4,761,924 | A * | 8/1988 | Gustafson | E04B 1/34352 |
| | | | | 52/126.6 |
| 4,768,900 | A | 9/1988 | Burland | |
| 4,866,797 | A * | 9/1989 | Vollan | E04B 1/34352 |
| | | | | 52/126.6 |
| 4,882,887 | A * | 11/1989 | Giles | E04B 1/34352 |
| | | | | 52/126.6 |
| 4,899,497 | A * | 2/1990 | Madl, Jr. | E04B 1/0007 |
| | | | | 52/126.6 |
| 4,914,875 | A * | 4/1990 | Gustafson | E04B 1/34352 |
| | | | | 52/126.6 |
| 4,974,986 | A * | 12/1990 | Cook | E04B 1/1906 |
| | | | | 403/141 |
| 5,088,565 | A | 2/1992 | Evarts | |
| 5,088,852 | A * | 2/1992 | Davister | E04B 1/1906 |
| | | | | 403/143 |
| 5,106,233 | A | 4/1992 | Breaux | |
| 5,117,925 | A | 6/1992 | White | |
| 5,240,348 | A | 8/1993 | Breaux | |
| 5,244,316 | A | 9/1993 | Wright et al. | |
| 5,263,544 | A | 11/1993 | White | |
| 5,301,480 | A * | 4/1994 | Oyama | E04F 15/02482 |
| | | | | 52/126.6 |
| 5,355,964 | A | 10/1994 | White | |
| 5,363,610 | A * | 11/1994 | Thomas | E04B 1/34347 |
| | | | | 52/126.6 |
| 5,388,931 | A | 2/1995 | Carlson | |
| 5,398,466 | A * | 3/1995 | Oyama | E04F 15/02458 |
| | | | | 52/126.6 |
| 5,409,192 | A * | 4/1995 | Oliver | E04B 1/34352 |
| | | | | 248/357 |
| 5,452,548 | A * | 9/1995 | Kwon | E01D 19/041 |
| | | | | 248/567 |
| 5,509,237 | A * | 4/1996 | Coulter | B60P 3/36 |
| | | | | 248/357 |
| 5,515,655 | A * | 5/1996 | Hoffmann | E02D 27/01 |
| | | | | 248/354.5 |
| 5,529,132 | A | 6/1996 | Evarts | |
| 5,544,979 | A | 8/1996 | White | |
| 5,609,380 | A | 3/1997 | White | |
| 5,626,434 | A * | 5/1997 | Cook | E04B 1/1903 |
| | | | | 403/171 |
| 5,653,556 | A | 8/1997 | White | |
| 5,794,716 | A | 8/1998 | White | |
| 5,862,635 | A * | 1/1999 | Linse | E04H 9/14 |
| | | | | 52/126.6 |
| 6,039,508 | A | 3/2000 | White | |
| 6,094,873 | A * | 8/2000 | Hoffman | E02D 27/01 |
| | | | | 52/126.6 |
| 6,324,795 | B1 * | 12/2001 | Stiles | E02D 27/34 |
| | | | | 52/167.4 |
| 6,347,489 | B1 * | 2/2002 | Marshall, Jr. | E02D 27/00 |
| | | | | 248/354.5 |
| 6,381,907 | B1 * | 5/2002 | MacKarvich | E04B 1/34352 |
| | | | | 52/105 |
| 6,394,704 | B1 | 5/2002 | Saeki et al. | |
| 6,427,402 | B1 | 8/2002 | White | |
| 6,431,795 | B2 | 8/2002 | White | |
| 6,442,906 | B1 * | 9/2002 | Hwang | E04F 15/0247 |
| | | | | 248/188.4 |
| 6,447,036 | B1 | 9/2002 | White | |
| 6,543,966 | B2 | 4/2003 | White | |
| 6,557,647 | B2 | 5/2003 | White | |
| 6,568,147 | B1 * | 5/2003 | Sumner, Sr. | E02D 27/02 |
| | | | | 52/169.9 |
| 6,641,323 | B2 * | 11/2003 | Ronsheim | F16C 11/106 |
| | | | | 269/25 |
| 6,648,556 | B1 | 11/2003 | White | |
| 6,672,805 | B1 | 1/2004 | White | |
| 6,732,483 | B1 | 5/2004 | White | |
| 6,736,218 | B1 | 5/2004 | White | |
| 6,896,448 | B1 | 5/2005 | White | |
| 6,908,262 | B1 | 6/2005 | White | |
| 6,988,564 | B2 | 1/2006 | White | |
| 7,168,890 | B1 | 1/2007 | Evarts | |
| 7,191,569 | B2 * | 3/2007 | Brown | E02D 5/801 |
| | | | | 52/111 |
| 7,392,855 | B1 | 7/2008 | White | |
| 7,526,899 | B1 * | 5/2009 | Oliver | E02D 27/01 |
| | | | | 52/292 |
| 7,694,747 | B1 | 4/2010 | White | |
| 7,708,499 | B1 | 5/2010 | Evarts et al. | |
| 7,824,132 | B1 | 11/2010 | White | |
| 7,854,571 | B1 | 12/2010 | Evarts | |
| 7,914,236 | B2 | 3/2011 | Neville | |

(56) References Cited

U.S. PATENT DOCUMENTS

| | | | |
|---|---|---|---|
| 7,922,145 B2* | 4/2011 | Martin | B28B 7/0032 |
| | | | 248/176.3 |
| 7,922,413 B2* | 4/2011 | Roth | B64C 1/066 |
| | | | 403/122 |
| 7,950,877 B2 | 5/2011 | Evarts | |
| 8,070,391 B2 | 12/2011 | White | |
| 8,181,713 B2 | 5/2012 | White | |
| 8,186,452 B1 | 5/2012 | White et al. | |
| 8,434,969 B2 | 5/2013 | White | |
| 8,496,072 B2 | 7/2013 | White | |
| 8,763,719 B2 | 7/2014 | White | |
| 8,769,893 B1* | 7/2014 | Gill | E02D 27/50 |
| | | | 248/188.5 |
| 9,249,551 B1 | 2/2016 | White | |
| 9,255,375 B2 | 2/2016 | Yingling et al. | |
| 9,458,593 B2* | 10/2016 | Hale | E02D 27/16 |
| 9,556,581 B2* | 1/2017 | Hale | E02D 5/223 |
| 9,556,621 B2* | 1/2017 | Pelc | E04F 15/02452 |
| 9,605,404 B2* | 3/2017 | Hale | E02D 33/00 |
| 9,631,335 B2* | 4/2017 | Reusing | E02D 5/56 |
| 9,957,684 B2 | 5/2018 | Suver et al. | |
| 10,400,413 B2* | 9/2019 | Reusing | E02D 35/005 |
| 2005/0039952 A1 | 2/2005 | Hill et al. | |
| 2006/0198706 A1 | 9/2006 | Neville | |
| 2007/0102603 A1* | 5/2007 | Newell | E04G 25/08 |
| | | | 248/219.2 |
| 2009/0065671 A1* | 3/2009 | Burgstaller | E04F 13/0808 |
| | | | 248/288.31 |
| 2010/0266344 A1 | 10/2010 | Plotkin et al. | |
| 2010/0303552 A1 | 12/2010 | Yingling et al. | |
| 2011/0162859 A1 | 7/2011 | White | |
| 2012/0292062 A1 | 11/2012 | White | |
| 2013/0149040 A1 | 6/2013 | Evarts | |
| 2014/0056652 A1 | 2/2014 | Suver | |
| 2014/0356075 A1 | 12/2014 | Hale | |
| 2014/0356076 A1* | 12/2014 | Hale | E02D 5/223 |
| | | | 405/255 |
| 2014/0377011 A1 | 12/2014 | Yingling et al. | |
| 2015/0016893 A1 | 1/2015 | Suver et al. | |
| 2016/0040439 A1* | 2/2016 | Pelc | E04F 15/02452 |
| | | | 52/126.6 |
| 2017/0101759 A1 | 4/2017 | Suver | |
| 2017/0167102 A1 | 6/2017 | Suver et al. | |

FOREIGN PATENT DOCUMENTS

| | | |
|---|---|---|
| CN | 2942801 A1 | 10/2015 |
| JP | 59228529 A | 12/1984 |
| JP | 497015 A | 3/1992 |
| JP | 2005256500 A | 9/2005 |
| JP | 2005315050 A | 11/2005 |
| JP | 2006089933 A | 4/2006 |
| JP | 2006177125 A | 7/2006 |
| JP | 2006312825 A | 11/2006 |
| JP | 2009138487 A | 6/2009 |
| NO | 46428 | 4/1929 |
| RU | 2109881 C1 | 4/1998 |
| WO | 9600326 A1 | 1/1996 |
| WO | 2012031108 A1 | 3/2012 |

OTHER PUBLICATIONS

USPTO, "Non-Final Office Action, U.S. Appl. No. 15/285,326," dated Jul. 11, 2018, 13 pages.

USPTO, "Non-Final Office Action, U.S. Appl. No. 15/372,196," dated Oct. 4, 2017, 23 pages.

USPTO, "Non-Final Office Action, U.S. Appl. No. 15/285,326," dated Dec. 28, 2017, 17 pages.

USPTO, "Final Office Action, U.S. Appl. No. 15/285,326", dated Aug. 14, 2017, 10 pages.

USPTO, "Non-Final Office Action, U.S. Appl. No. 15/285,326", dated Apr. 25, 2017, 10 pages.

USPTO, "Non-Final Office Action, U.S. Appl. No. 15/285,326," dated Feb. 22, 2019, 11 pages.

* cited by examiner

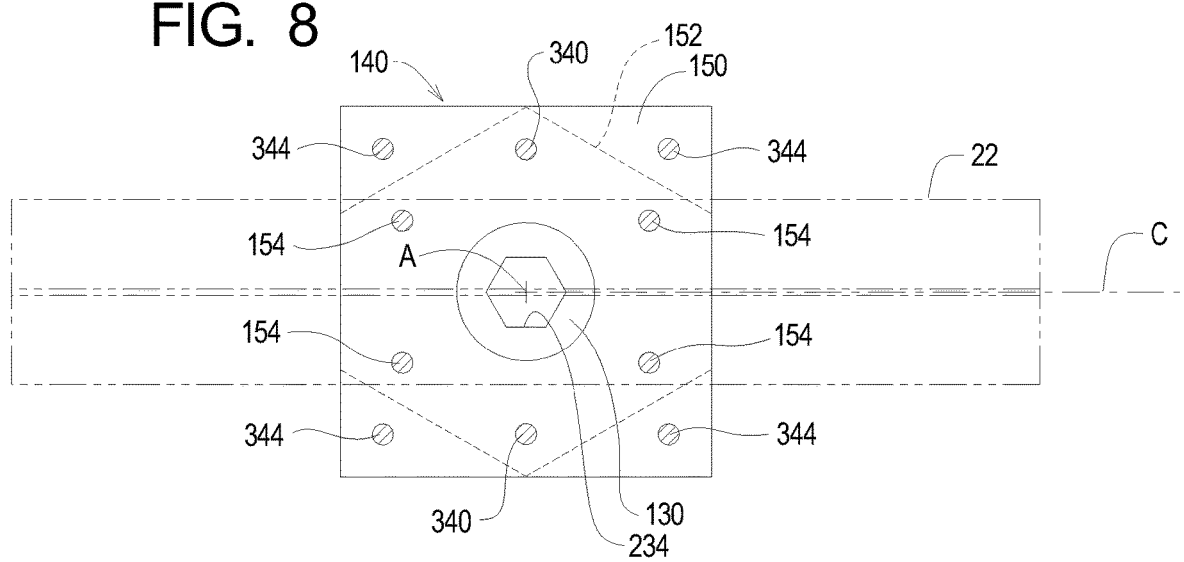
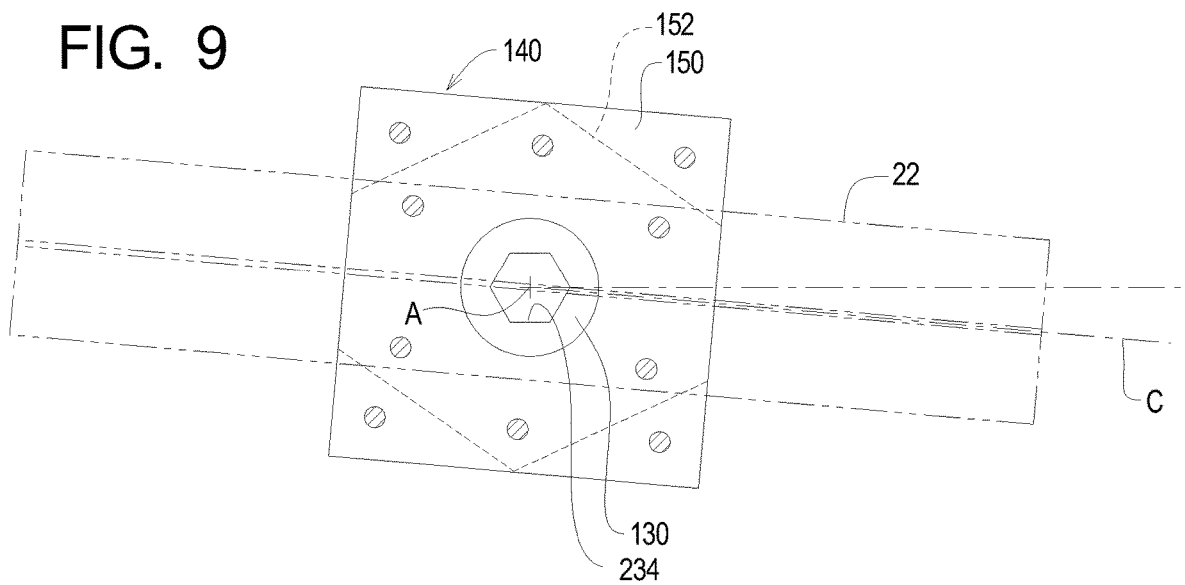

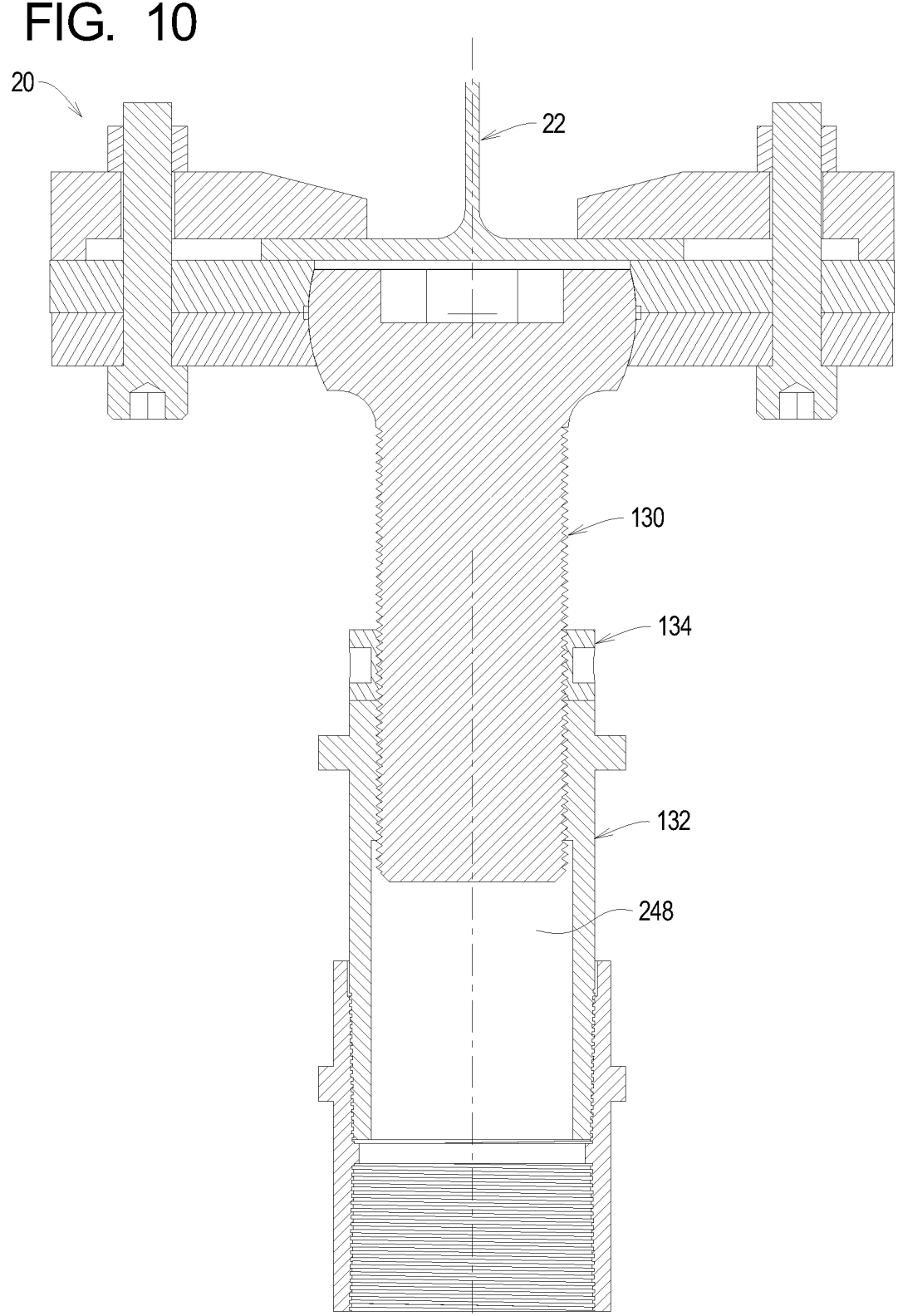

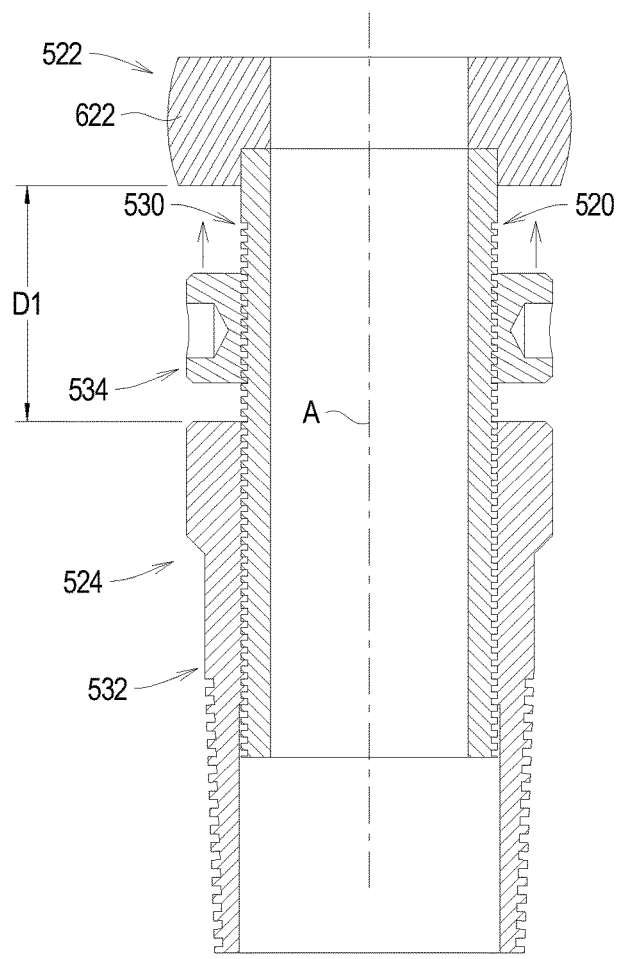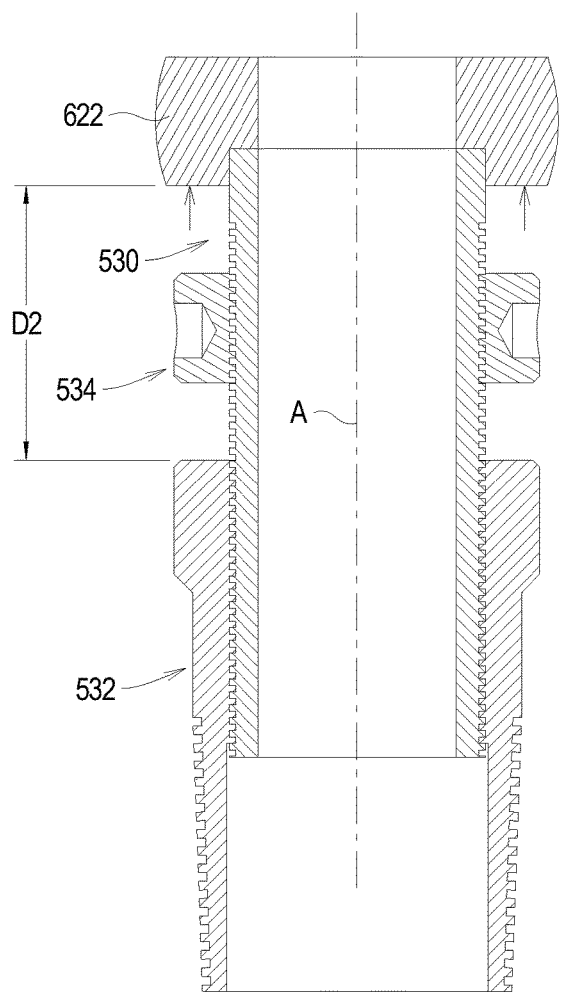

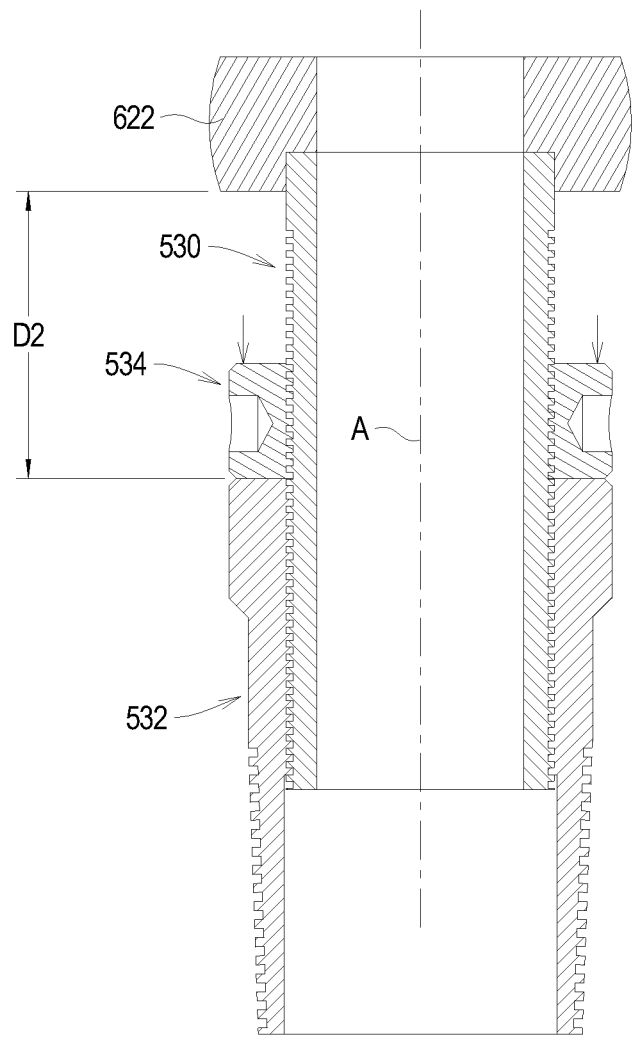

SYSTEMS AND METHODS FOR CONNECTING A STRUCTURAL MEMBER TO A PILE

RELATED APPLICATIONS

This application, U.S. patent application Ser. No. 15/174,724 filed Jun. 6, 2016, claims benefit of U.S. Provisional Application Ser. No. 62/172,485 filed Jun. 8, 2015, the contents of which are incorporated herein by reference.

TECHNICAL FIELD

The present invention relates to systems and methods for connecting a pile to a structural member supported by the pile.

BACKGROUND

Piles are often driven into the ground to form platform for supporting a structure such as a pipeline. The particular environment through which the pipeline extends will determine whether a particular pipeline is arranged above or below ground. The present invention is of particular significance when applied to above ground or elevated pipelines, and that example of the present invention will be described herein in detail. However, the principles of the present invention may be applied to piles used to support structures other than pipelines such as elevated tracks, elevated roadways, and the like.

An elevated pipeline typically comprises a pile driven into the ground, a pile cap secured to the pile, an I-beam connected to the pile cap, and a pipe structure connected to the I-beam. Conventional elevated pipelines employ a pile cap that is welded to the pile. The process of driving a pile into the earth is typically imprecise, so the welding of a pile cap to the pile such that the I-beam is supported in the correct orientation for the pipe structure typically requires significant time, effort, expertise, and expense.

The need exists for pile cap systems and methods for facilitating the connection of a pile to a structure such as an I-beam for supporting a pipe structure.

SUMMARY

The present invention may be embodied as a connecting system for connecting a pile to a structural member comprising a core portion, a first interface portion, and a second interface portion. The core portion defines a system axis. The first interface portion defines a reference plane and is adapted to be connected to the core portion and the structural member. The second interface portion is adapted to be connected to the core portion and the pile. The second interface portion fixes a position of the system axis relative to the pile. The core portion allows adjustment of a position of the reference plane relative to the system axis.

The present invention may also be embodied as a method of connecting a pile to a structural member comprising the following steps. A core portion defining a system axis is connected to the structural member to define a reference plane. The core portion is connected to the pile. An effective length of the core portion is adjusted, and the effective length of the core portion is secured. A position of the reference plane relative to the system axis is adjusted, and the position of the reference plane relative to the system axis is secured.

BRIEF DESCRIPTION OF THE DRAWINGS

FIGS. 8 and 9 are top plan views illustrating the first example connecting system connected to a structural member in angled configuration in a second plane;

FIG. 10 is an end elevation cutaway view illustrating the first example connecting system connected to a structural member in an extended configuration;

FIGS. 17-19 are end cutaway views similar to FIG. 16 illustrating the process of adjusting an effective length of the second example connecting system;

DETAILED DESCRIPTION

The principles of the present invention may be embodied in a number of configurations of connecting systems or methods for supporting a structural member relative to a pile, and several example connection systems of the present invention will be described herein. The example connecting systems or assemblies of the present invention may be configured to be used with different types of piles and different structural members, but specific piles and structural members will be described below to facilitate a complete understanding of the present invention.

I. FIRST EXAMPLE CONNECTING SYSTEM

Figure 1:
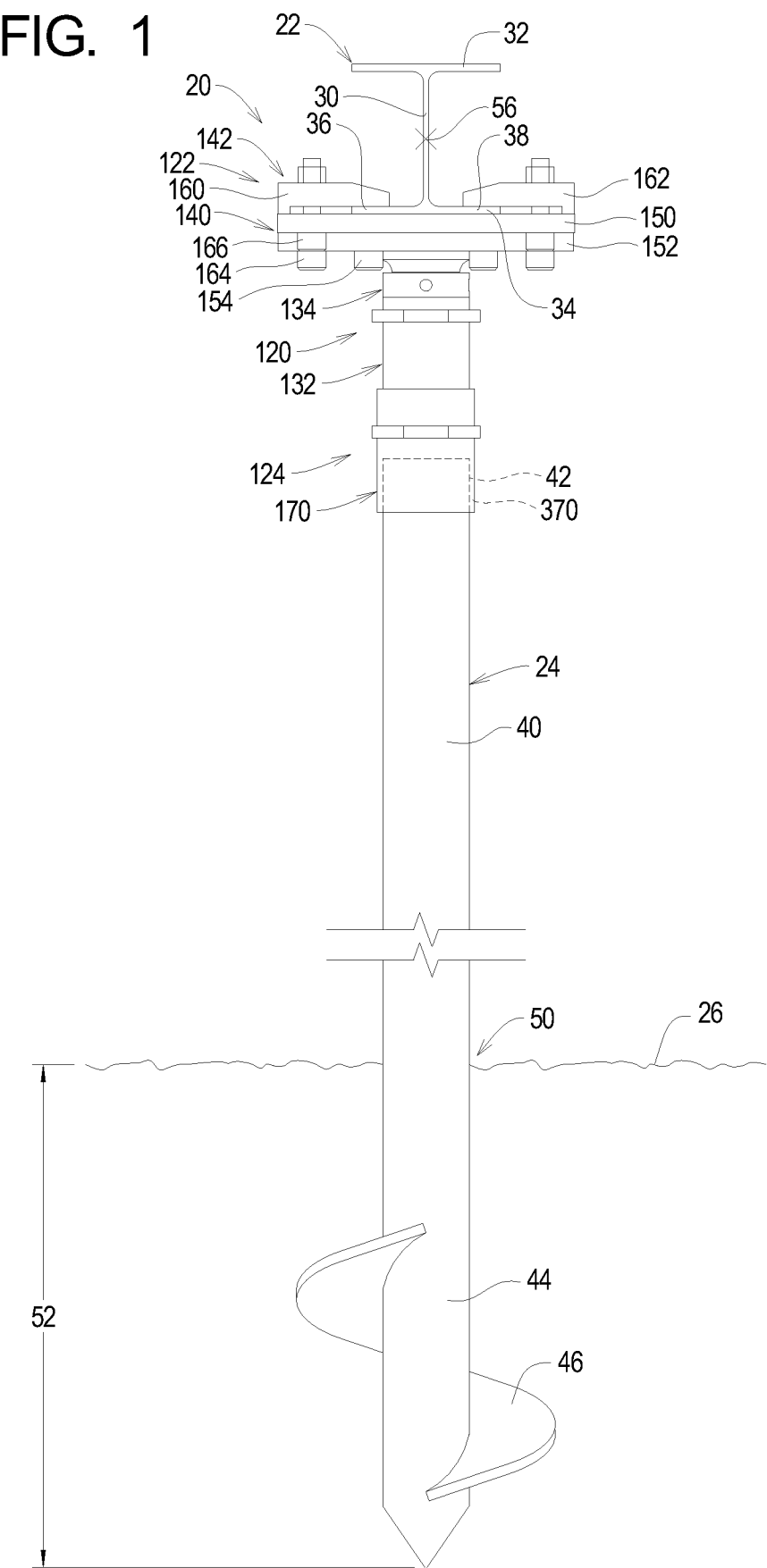
FIG. 1 is a side elevation view of a first example connecting system of the present invention being used to connect a structural member to a pile.
Figure 2:
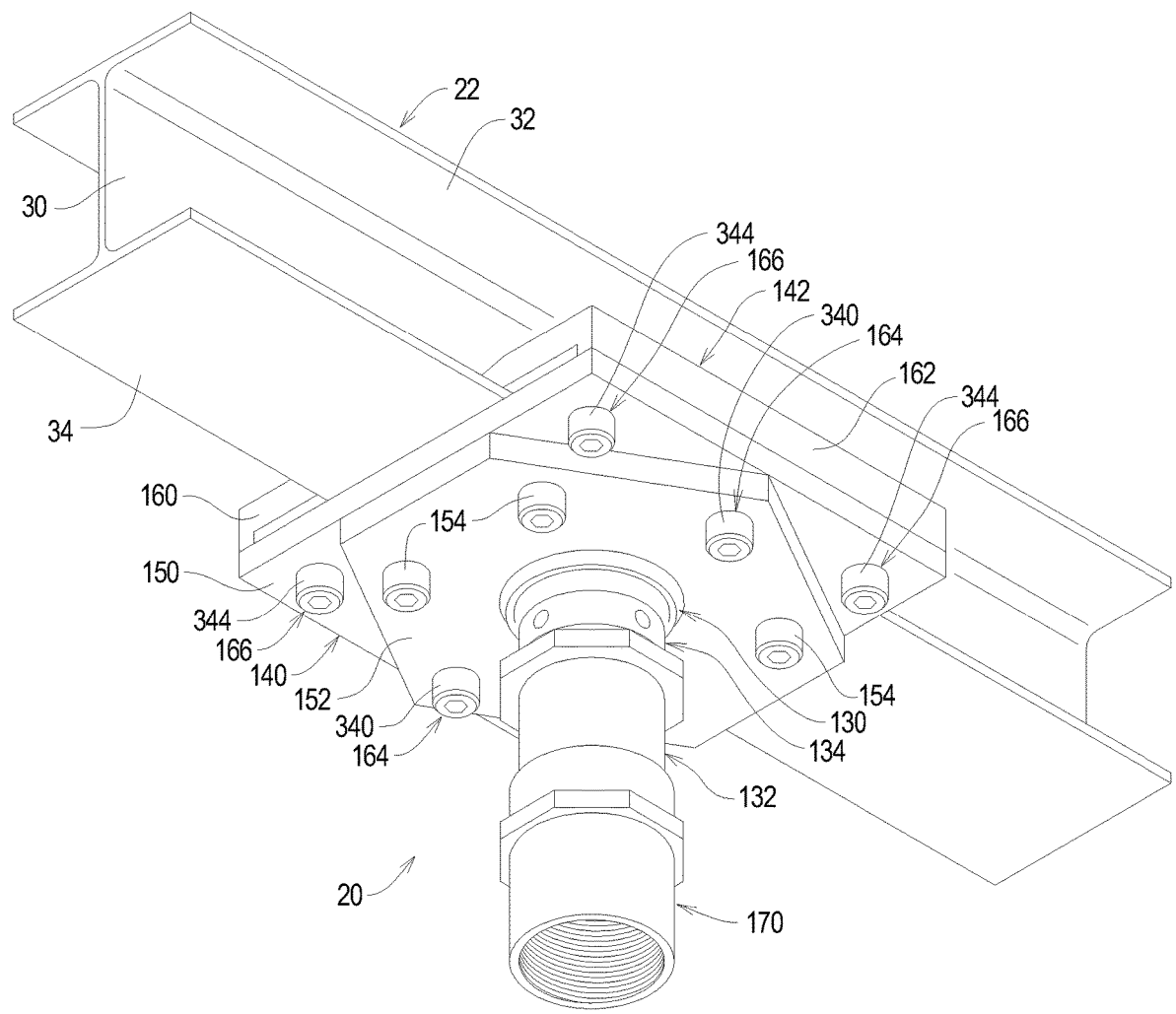
FIG. 2 is a bottom isometric view illustrating the first example connecting system connected to a structural member.

Referring initially to FIG. 1 of the drawing, depicted therein is an example connecting assembly 20 adapted to connect a structural member 22 to a pile 24 supported in the earth 26. The structural member 22 and pile 24 are not by themselves part of the present invention. The structural member 22 and the pile 24 will thus be described herein only to that extent necessary for a complete understanding of the present invention.

FIG. 1 illustrates that the example structural member 22 is or may be a conventional I-beam comprising a web 30, an upper flange 32, and a lower flange 34. In the example structural member 22, the lower flange comprises a first lateral portion 36 and a second lateral portion 38. Typically, a structural member such as the example structural member 22 is sized, dimensioned, and configured to span a distance and/or support a load (not shown) such as a pipe structure forming a part of a larger pipeline.

FIG. 1 also illustrates that the example pile 24 comprises a central portion 40, an upper portion 42, and a lower portion 44. The example pile 24 further comprises a helical flange 46 arranged at the lower portion 44. The example pile 24 is thus intended to be augered into the earth 26 at a ground location 50, to a ground depth 52, and at a pile angle 54 (see, e.g., FIG. 7) with respect to vertical.

When the pile 24 is driven into the earth 26 as shown in FIG. 1, the upper portion 42 of the pile 24 should be at or near a predetermined location 56 in three-dimensional space above the earth 26 as required by the design of the structure supported by the structural member 22. Once the pile 24 is driven into the earth 26, the pile angle 54 and the location of the upper portion 42 of the pile are not practically alterable. Modification to the pile 24 is typically required to adjust the pile 24 if the pile angle 54 and location of the upper portion 42 are not as desired with respect to the predetermined location 56. Such modification of the pile 24 may not be possible or practical.

Figure 3:
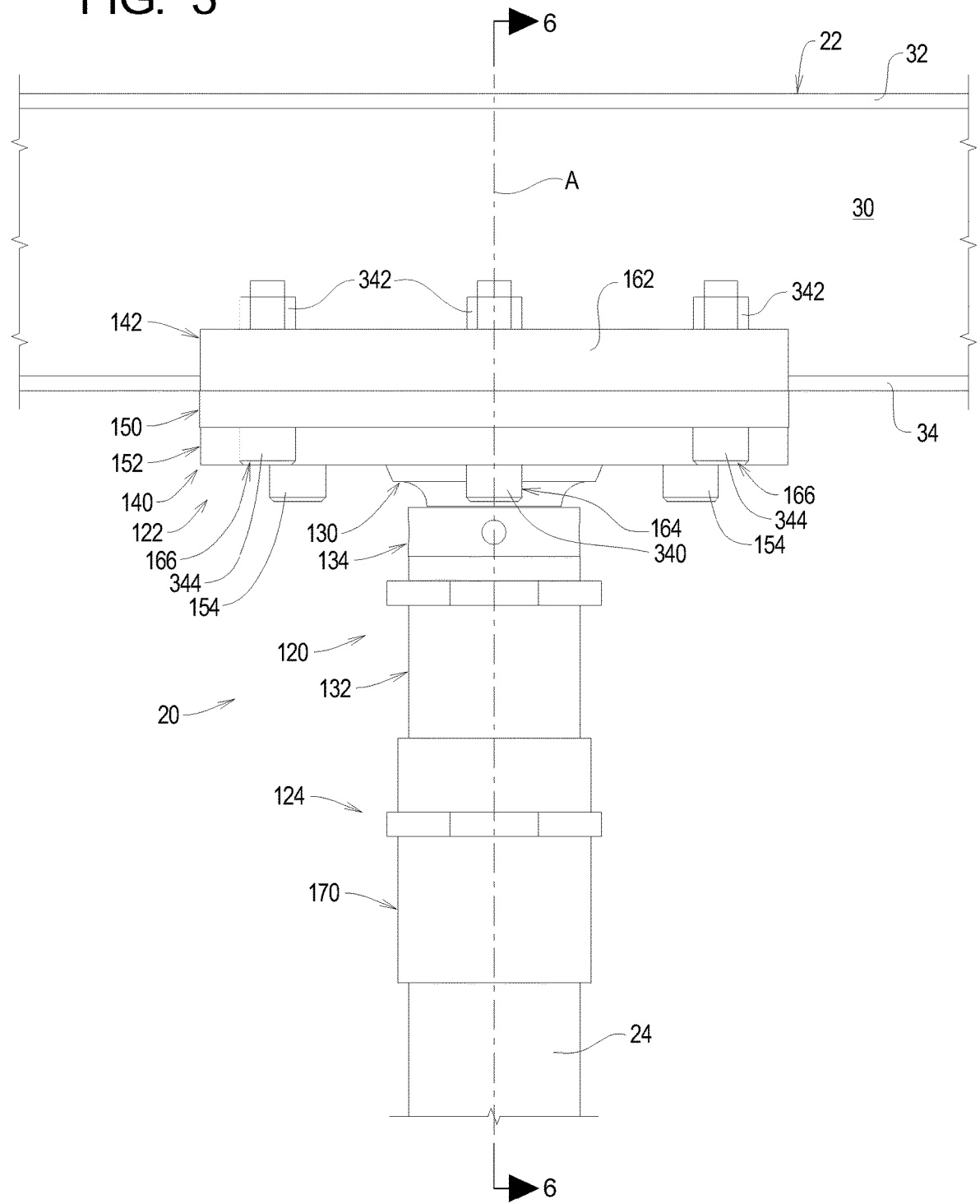
FIG. 3 is a side elevation view illustrating the first example connecting system connected to a structural member.
Figure 4:
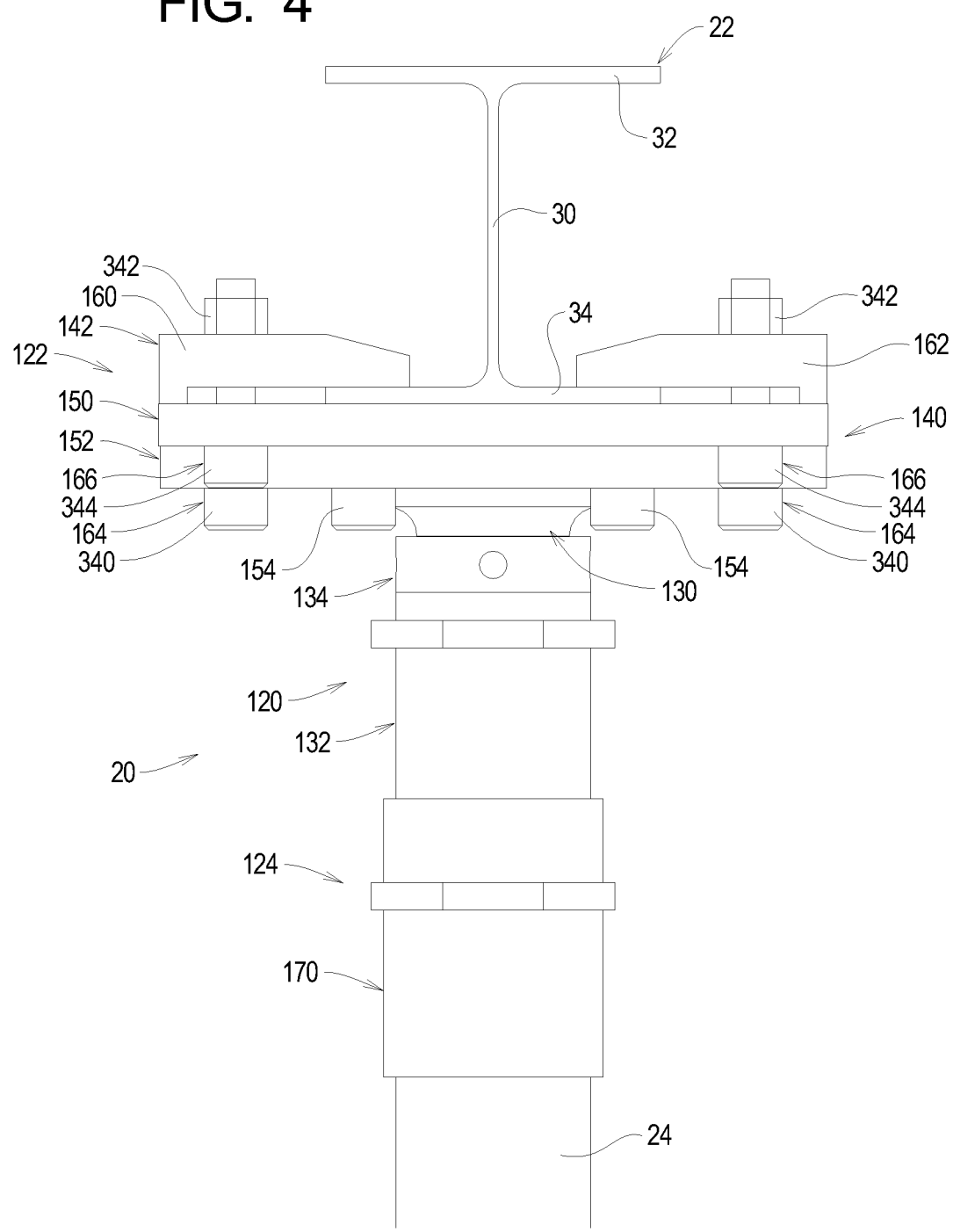
FIG. 4 is an end elevation view illustrating the first example connecting system connected to a structural member.
Figure 6:
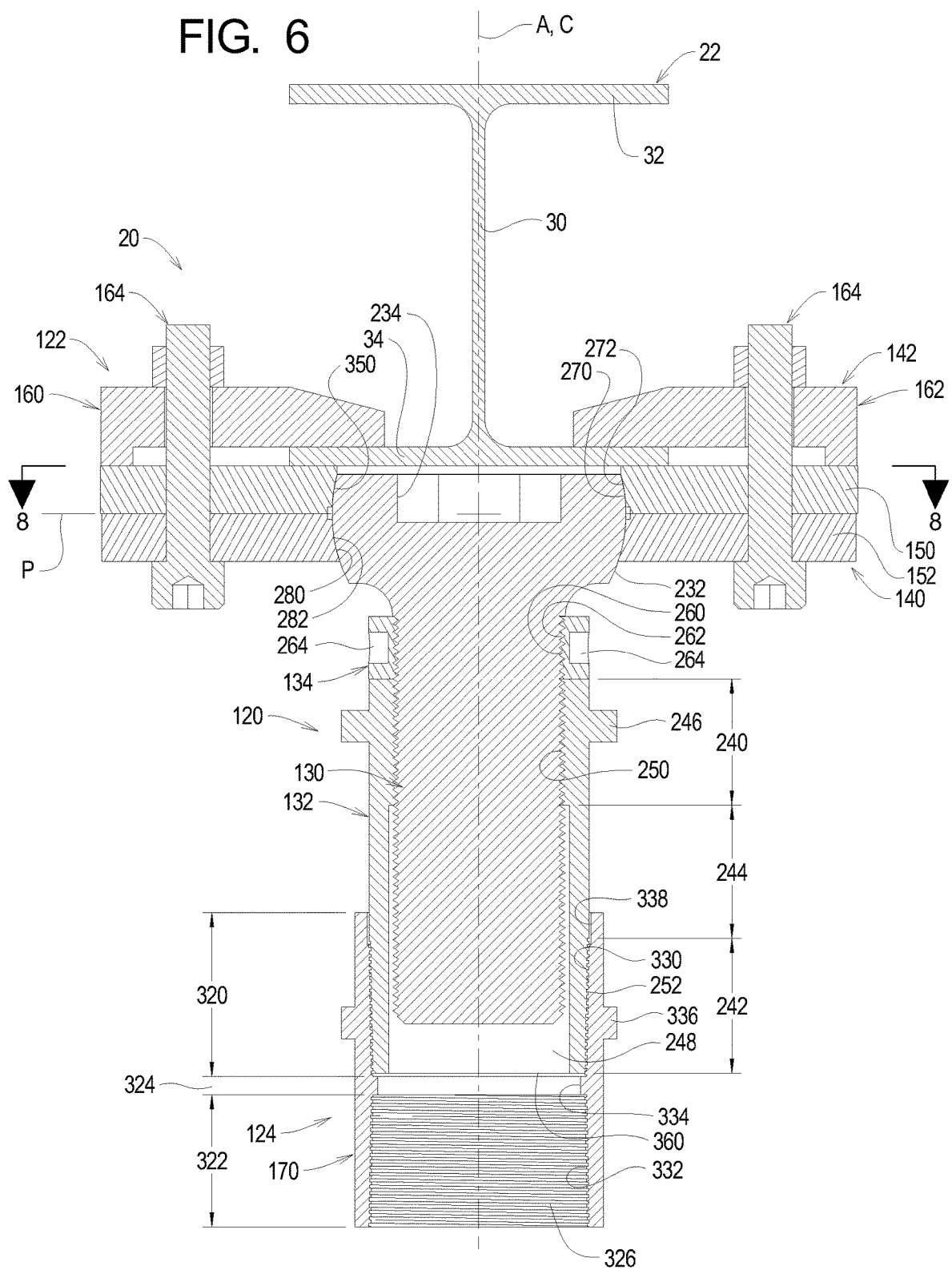
FIG. 6 is an end elevation cutaway view illustrating the first example connecting system connected to a structural member.

Referring now to FIGS. 3, 4, and 6 of the drawings, it can be seen that the example connecting assembly 20 comprises a core portion 120, a first interface portion 122, and a second interface portion 124. As will be explained in detail below, the first interface portion 122 is configured to engage the structural member 22 and the core portion 120, and the second interface portion 124 is configured to engage the pile 24 and the core portion 120. Further, the core portion 120 allows adjustment of the first interface portion relative to the second interface portion 124 in a number of axes such as along a system axis A, at an angle with respect to the system axis A, an offset distance with respect to the system axis A, and at different radial locations about the system axis A.

Referring now to FIGS. 3-6 of the drawing, it can be seen that the core portion 120 comprises a plug member 130, a sleeve member 132, and a lock member 134. The first interface portion 122 comprises a plate assembly 140 and a clip assembly 142. The plate assembly 140 comprises a first plate 150, a second plate 152, and a plurality of plate bolts 154. The clip assembly 142 comprises first and second clip plates 160 and 162, a plurality of first clip bolt assemblies 164, and a plurality of second clip bolt assemblies 166. The example second interface portion 124 comprises a coupler member 170.

Figure 5:
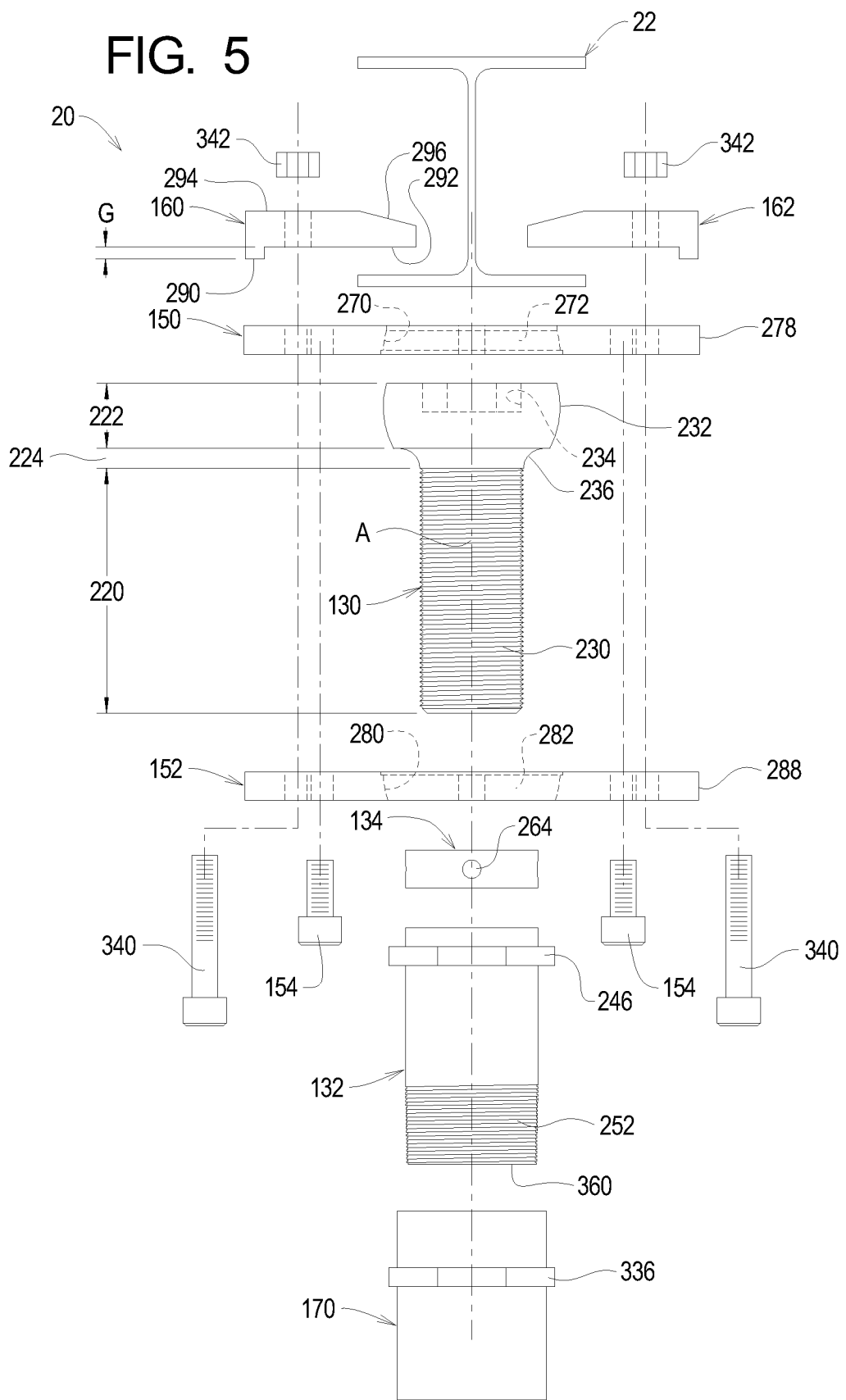
FIG. 5 is a side elevation exploded view illustrating the first example connecting system in relation to a structural member.

As perhaps best shown in FIGS. 5 and 6, the plug member 130 comprises a shaft portion 220, a head portion 222, and a transition portion 224. The shaft portion 220 is generally in the form of a cylindrical solid defining the system axis A. The shaft portion 220 further defines a plug threaded surface 230. The head portion 222 is also generally cylindrical but defines a plug curved, generally circular or spherical outer surface 232 and a plug drive surface 234 at one end. The transition portion 224 defines a transition surface 236. The sleeve member 132 is generally in the shape of a hollow cylinder and comprises a first interface portion 240, a second interface portion 242, a spacing portion 244, and a drive projection 246. A sleeve passageway 248 extends through the sleeve member 132. A sleeve first threaded surface 250 is formed on an inner surface of the sleeve member 132 in the first interface portion 240, and a sleeve second threaded surface 252 is formed on an outer surface of the sleeve member 132 in the second interface portion 242. The lock member 134 is generally in the shape of a hollow cylinder and defines a lock opening 260. A lock threaded surface 262 is formed on an inner surface of the lock member 134, and one or more drive recesses 264 are formed in an outer surface of the lock member 134.

Figure 12:
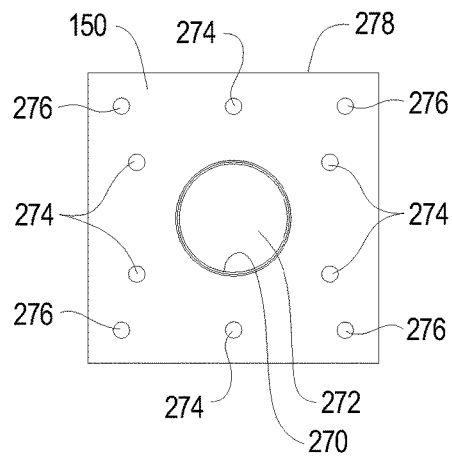
FIG. 12 is a plan view of a first plate of the example first example connecting system.

Referring now again to FIGS. 2-6, the example first interface portion 122 will now be described in further detail. FIGS. 6 and 12 illustrate that the first plate 150 of the plate assembly 140 comprises a first plate curved surface 270 surrounding a first plate opening 272. A plurality of first plate tapped holes 274 and first plate thru holes 276 are formed in the first plate 150. The example first plate 150 comprises six tapped holes 274 and four thru holes 276 (see FIG. 9). The first plate 150 further defines a first plate perimeter surface 278 defining a first plate configuration. As perhaps best shown in FIG. 9, the first plate configuration is square in the example first plate 150.

Figure 13:
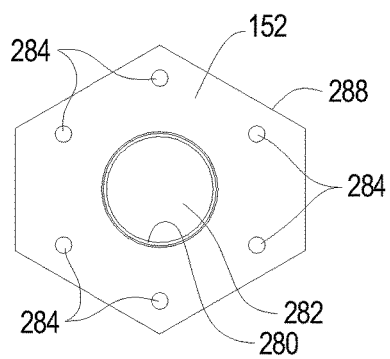
FIG. 13 is a plan view of a second plate of the example first example connecting system.

FIGS. 6 and 13 further illustrates that the second plate 152 of the plate assembly 140 comprises second plate curved surface 280 surrounding a second plate opening 282. A plurality of second plate thru holes 284 are formed in the second plate 152. The example second plate 152 comprises six thru holes 284. The second plate 152 further defines a second plate perimeter surface 288 defining a second plate configuration. The first plate configuration is six-sided in the example second plate 152.

The example first and second clip plates 160 and 162 are identical, but these clip plates 160 and 162 may differ in size, shape, and composition from each other and/or from what is depicted in the drawing depending upon the exact nature of the structural member being connected thereto. Because the example first and second clip plates 160 and 162 are identical, only the first clip plate 160 will be described in detail herein.

Figure 14:
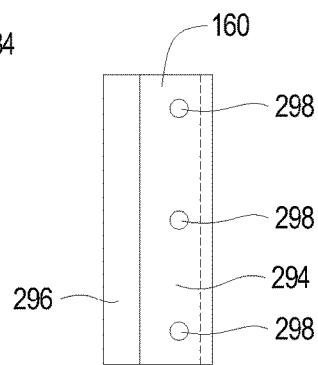
FIG. 14 is a plan view of a clip plate of the example first example connecting system.

FIG. 5 illustrates that the example first clip plate 160 defines a first engaging surface 290, a second engaging surface 292, a first surface portion 294, and a second engaging portion 296. The first and second engaging surfaces 290 and 292 are offset from each other to define a clip gap G. A plurality of thru holes 298 are formed in the example first clip plate 160 (FIG. 14). Three example thru holes 298 are formed in the example first clip plate 160.

Turning now to FIGS. 5 and 6 of the drawings, it can be seen that the example coupler member 170 comprises a first coupler interface portion 320, a second coupler interface portion 322, and an intermediate coupler portion 324 and defines a coupler passageway 326. A coupler first threaded surface 330 is formed on an interior surface of the first coupler interface portion 320 of the coupler member 170. A coupler second threaded surface 332 is formed on an interior surface of the second coupler interface portion 322 of the coupler member 170. A coupler stop projection 334 extends from the interior surface of the intermediate coupler portion 324 of the coupler member 170. A coupler drive projection 336 extends from the exterior surface of the first coupler interface portion 320 of the coupler member 170. A coupler annular surface 338 is formed on an interior surface of the first coupler interface portion 320 adjacent to an end of the coupler member 170.

The first clip bolt assemblies 164 each comprise a first clip bolt 340 and a clip nut 342. The second clip bolt assemblies 166 each comprise a second clip bolt 344 and a clip nut 342. The first clip bolts 340 are longer than the second clip bolts 342 as will be described in further detail below.

The example core portion 120 and first interface portion 122 are assembled and connected together as follows.

Initially, the shaft portion 220 of the plug member 130 is passed through the second plate opening 282 of the second plate 152 such that the plug curved surface 232 faces the second plate curved surface 280. The curved surfaces 232 and 280 are sized and dimensioned such that the plug curved surface 232 cannot pass through the second plate opening 282.

The core portion 120 of the connecting assembly 20 is formed by first engaging the plug threaded surface 230 with the lock threaded surface 260 and axially rotating the plug member 130 and the lock member 134 relative to each other. At least initially, as shown in FIGS. 3 and 5, the lock member 134 will be displaced relative to the plug member 130 until the lock member 134 is adjacent to the transition surface 236 of the plug member 130. Next, the plug threaded surface 230 is engaged with the sleeve first threaded surface 250 and at least one of the plug member 130 and the sleeve member 132 is rotated relative to the other to displace the sleeve member 132 relative to the plug member 130. Typically, as shown in FIGS. 3 and 5, the sleeve member 132 will, at least initially, be displaced along the plug member 130 until the sleeve member 132 is in contact with the lock member 134.

At this point the second plate 152 is held between the sleeve member 132 and the head portion 222 of the plug member 130. However, the second plate 152 may move up and down and pivot within a limited range of movement relative to (both along and angularly with respect to) the system axis A.

The plate assembly 140 is then formed by arranging the first plate 150 such that the first plate curved surface 270 faces the plug curved surface 232 and such that at least some of the second plate thru holes 284 are aligned with the first plate tapped holes 274. The plate bolts 154 are then inserted through the second plate thru holes 284 and threaded into the corresponding first plate tapped holes 274.

At this point, further tightening of the plate bolts 154 draws the first and second plates 150 and 152 together such that the first plate curved surface 270 and the second plate curved surface 280 form an annular chamber 350 that surrounds at least a portion of the plug curved surface 232 and such that the plate assembly defines a plate or reference plane P at the interface of the first and second plates 150 and 152. Further, the curved surfaces 232, 270, and 280 are complementary such that, when the plate bolts 154 are not fully tightened, the head portion 222 of the plug member 130 form a ball joint that allows the plate assembly 140 to pivot such that the plate plane P moves through a range of angular orientations relative to the system axis A. However, fully tightening of the plate bolts 154 pulls the plate curved surfaces 270 and 280 against the plug curved surface 232 such that friction inhibits movement of the plate assembly 140 relative to the plug member 130 and thus allows the angular orientation of the plate plane P to be substantially fixed relative to the system axis A.

The clip assembly 142 is then formed first arranging each of the first and second clip plates 150 and 152 such that each of the clip plate thru holes 298 is aligned with a set of thru holes 276 and a tapped hole 274 in the first plate 150. In the example clip assembly 142, the first clip bolts 340 are extended through the middle of the three clip plate thru holes 298 and the corresponding second plate thru hole 284 and first plate tapped hole 274 associated with that middle clip plate thru hole 298. The second clip bolts 344 are then each threaded into one of the first plate thru holes 236 and extended through one of the clip plate thru holes 298. The clip nuts 342 are then tightened to form the clip assembly 142 and also to secure the clip assembly 142 relative to the plate assembly 140. A clip axis C is defined by the first and second clip plates 150 and 152.

The core portion 120 is secured to the second interface portion 124 as follows. Initially, the core sleeve 132 is arranged such that the longitudinal axis thereof is aligned with the longitudinal axis of the coupler member 170. The external threading of the sleeve second threaded surface 252 is then brought into contact with the internal threading of the coupler first threaded surface 330. Axial rotation of the core sleeve 132 relative to the coupler member 170 causes the sleeve second threaded surface 252 to engage the coupler first threaded surface 330. The core sleeve 132 and coupler member 170 are axially rotated until a lower end 360 of the core sleeve 132 engages the coupler stop projection 334 and the coupler annular surface 338 overlaps a portion of the outer surface of the sleeve spacing portion 244.

With the core portion 120 secured to the first and second interface portions 122 and 124 as described above, the connecting assembly 20 is formed.

Figure 7:
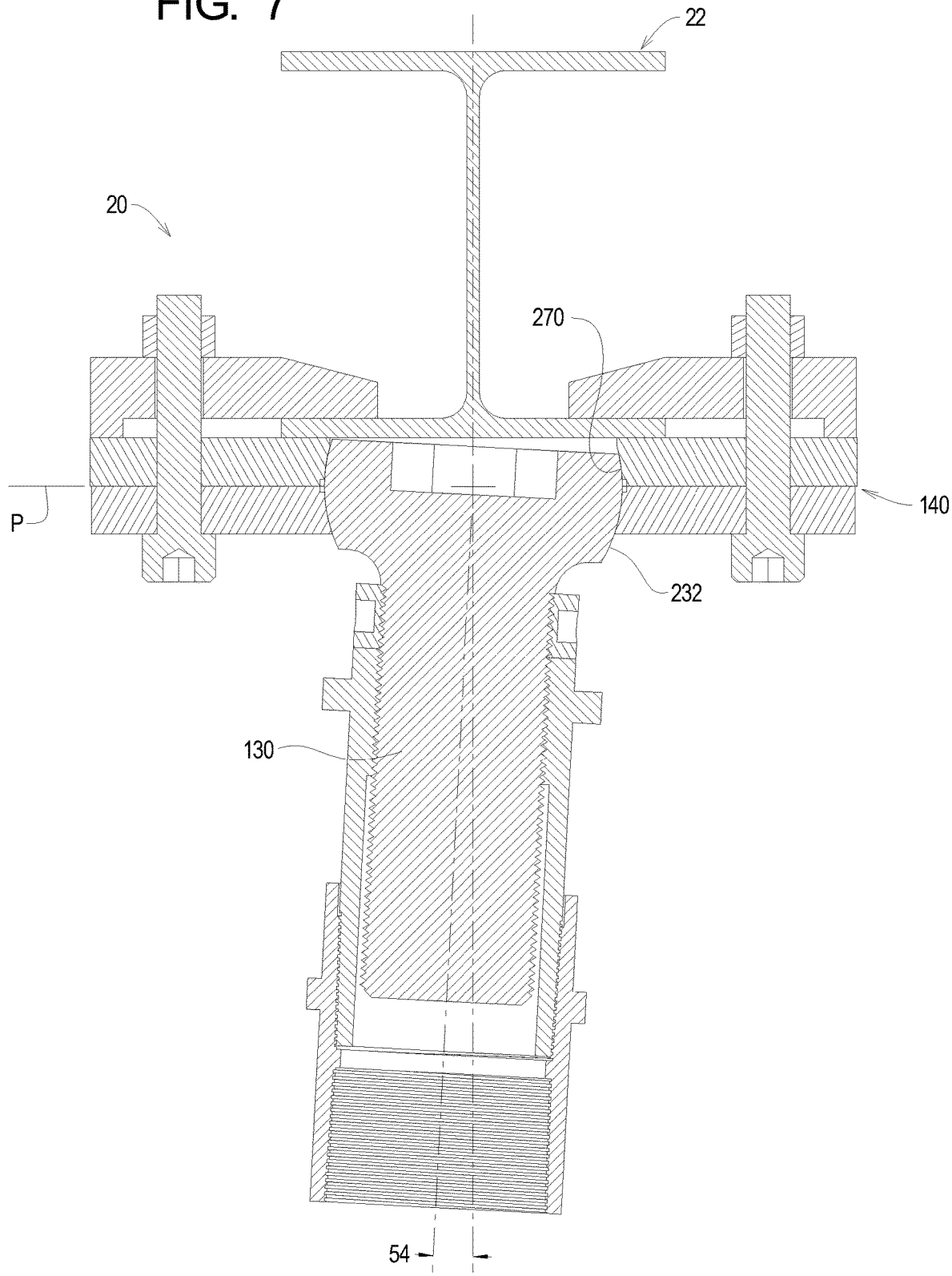
FIG. 7 is an end elevation cutaway view illustrating the first example connecting system connected to a structural member in an angled configuration in a first plane.
Figure 11:
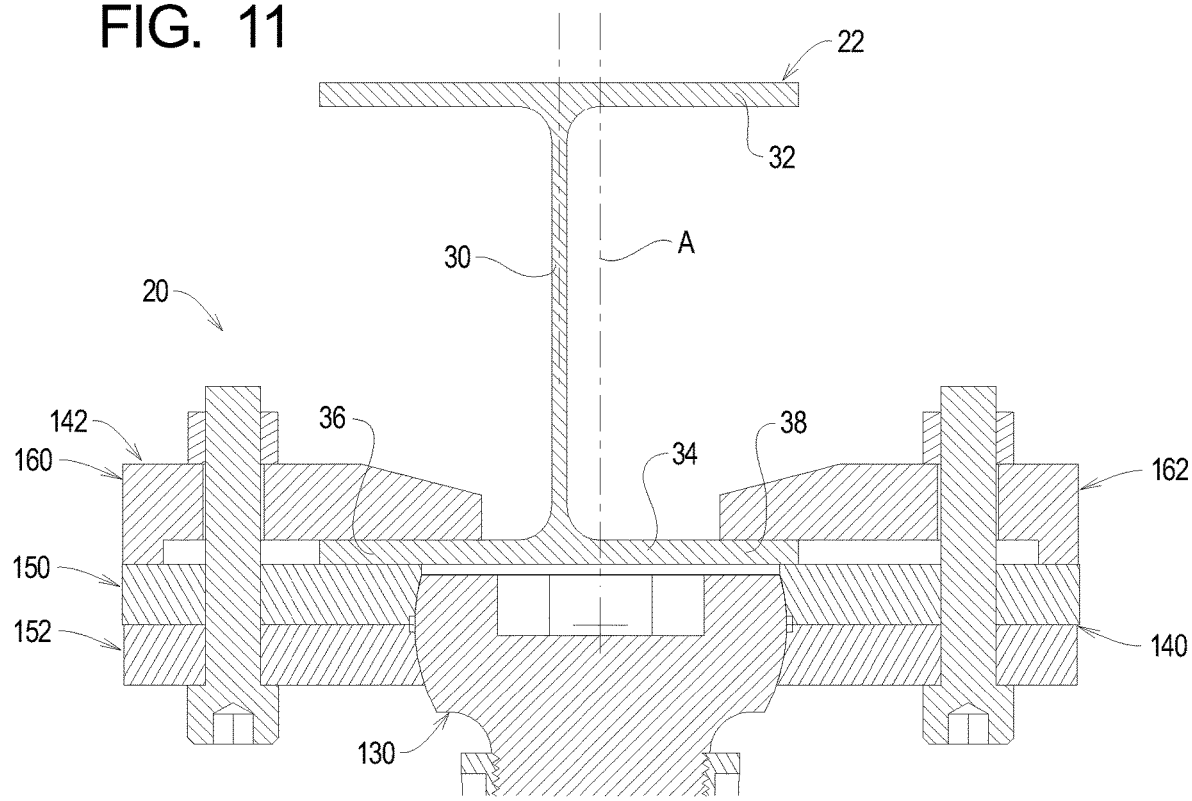
FIG. 11 is an end elevation cutaway view illustrating the first example connecting system connected to a structural member in an offset configuration.

Referring now to FIGS. 7-11 of the drawing, it can be seen that the connecting assembly 20 can be adjusted to accommodate an existing driven pile and a particular orientation of structural member. In FIG. 7, the structural member 22 is substantially horizontal, and the pile 24 is canted at an angle with respect to horizontal. The ball joint formed by the interaction of the plate assembly 140 and the plug member 130 allows the connecting assembly 20 to accommodate this difference in angle. FIGS. 8 and 9 illustrate that the ball joint formed by the plate assembly 140 and the plug member 130 further allows an angular position of the clip axis C to be moved to any radial angular position relative to the system axis A. FIG. 10 illustrates that the plug member 130 may be rotated relative to the sleeve member 132 to alter an effective length of the pile 24. And FIG. 11 illustrates that clip plates 150 and 152 allow a limited amount offset between a plane defined by the web 30 of the structural member 22 and the system axis A. It should be clear that combination of these adjustments is available given the particulars of a particular structural member and pile.

Further, the exact size and dimensions of and method of forming the connecting assembly 20 will, in practice, vary depending upon the nature of the structural member 22 and/or the pile 24. For example, the spacing between the clip plates 160 and 162 and the dimension of the clip gap G will be determined for a particular structural member 22.

As another example, the exact nature of the coupler second portion 322 will depend upon the nature of the pile 24. For a pile having an externally threaded upper end 370 as shown in FIG. 1, the second coupler portion 322 will be provided with the internally threaded second coupler threaded surface 332 as shown and described herein. The second coupler portion 322 may be configured differently for different pile types.

Further, the method and procedures for assembling the connecting assembly 20 may vary depending upon nature of the structural member 22 and/or the pile 24. For example, with a pile like the pile 24 having a threaded upper end, the coupler member 170 may be assembled onto the pile 24 before being connected to the sleeve member 132.

II. SECOND EXAMPLE CONNECTING SYSTEM

Referring now to FIGS. 15-19 of the drawing, depicted therein is a second example connecting assembly 420 adapted to connect a structural member 422 to a pile, such as the pile 24 described above, that is supported in the earth. The structural member 422 and pile are not by themselves part of the present invention and thus will be described herein only to that extent helpful to a complete understanding of the present invention.

Figure 15:
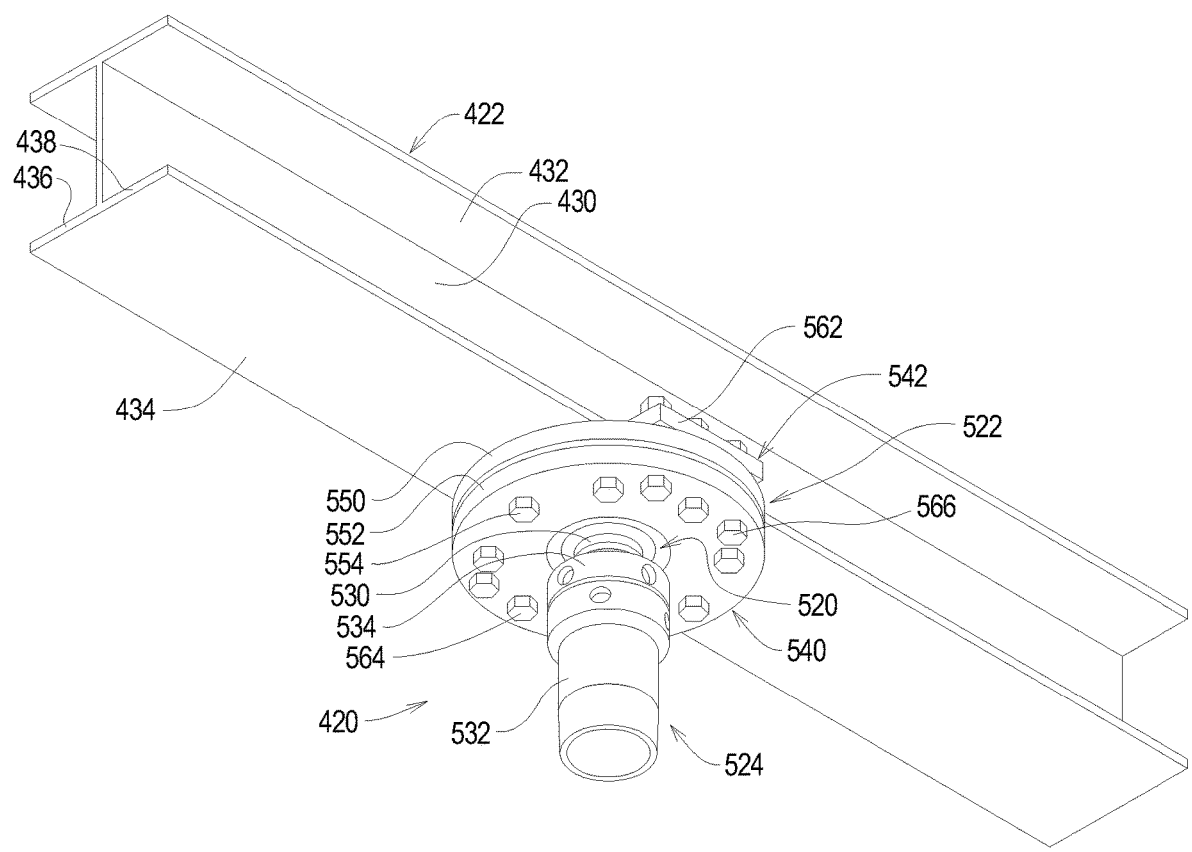
FIG. 15 is a bottom isometric view illustrating a second example connecting system of the present invention.

FIG. 15 illustrates that the example structural member 422 is or may be a conventional I-beam comprising a web 430, an upper flange 432, and a lower flange 434. In the example structural member 422, the lower flange comprises a first lateral portion 436 and a second lateral portion 438. Typically, a structural member such as the example structural member 422 is sized, dimensioned, and configured to span a distance and/or support a load (not shown) such as a pipe structure forming a part of a larger pipeline.

As with the example pile 24 described above, when the pile supporting the second example connecting assembly 420 is driven into the earth, an upper portion of the pile should be at or near a predetermined location in three-dimensional space above the earth as required by the design of the structure supported by the structural member 422.

Figure 16:
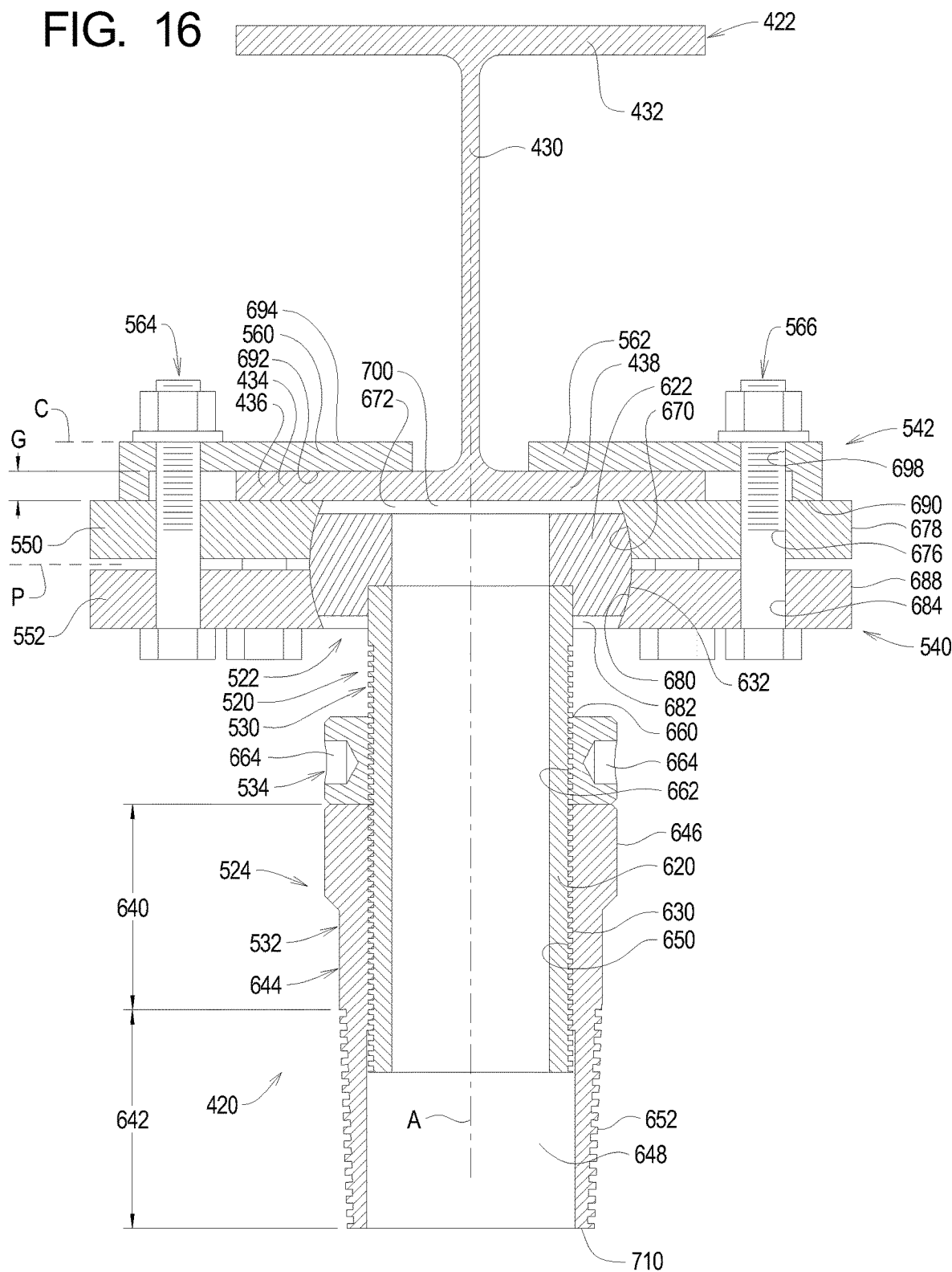
FIG. 16 is an end elevation cutaway view illustrating the second example connecting system connected to a structural member.

FIG. 16 of the drawing illustrates that the example connecting assembly 420 comprises a core portion 520, a first interface portion 522, and a second interface portion 524. As will be explained in detail below, the first interface portion 522 is configured to engage the structural member 422 and the core portion 520, and the second interface portion 524 is configured to engage the pile 24 and the core portion 520. Further, the core portion 520 allows adjustment of the first interface portion 522 relative to the second interface portion 524 in a number of axes such as along a system axis A, at an angle with respect to the system axis A, an offset distance with respect to the system axis A, and at different radial locations about the system axis A.

The example core portion 520 comprises a plug member 530, a sleeve member 532, and a lock member 534. The first interface portion 522 comprises a plate assembly 540 and a clip assembly 542. The plate assembly 540 comprises a first plate 550, a second plate 552, and a plurality of plate bolts 554. The clip assembly 542 comprises first and second clip plates 560 and 562, a plurality of first clip bolt assemblies 564, and a plurality of second clip bolt assemblies 566. The example second interface portion 524 comprises a coupler member (not shown) like the coupler member 170 described above.

As perhaps best shown in FIG. 17, the plug member 530 comprises a shaft portion 620 and a head portion 622. The shaft portion 620 is generally in the form of a hollow cylinder defining the system axis A. The shaft portion 620 further defines a plug threaded surface 630. The head portion 622 is also generally cylindrical but defines a plug curved, generally circular outer surface 632. The sleeve member 532 is generally in the shape of a hollow cylinder and comprises a first interface portion 640, a second interface portion 642, a spacing portion 644, and a drive projection 646. A sleeve passageway 648 extends through the sleeve member 532. A sleeve first threaded surface 650 is formed on an inner surface of the sleeve member 532 in the first interface portion 640, and a sleeve second threaded surface 652 is formed on an outer surface of the sleeve member 532 in the second interface portion 642. The lock member 534 is generally in the shape of a hollow cylinder and defines a lock opening 660. A lock threaded surface 662 is formed on an inner surface of the lock member 534, and one or more drive recesses 664 are formed in an outer surface of the lock member 534.

The example first interface portion 522 will now be described in further detail. The first plate 550 of the plate assembly 540 comprises a first plate curved surface 670 surrounding a first plate opening 672. A plurality of first plate tapped holes (not visible) and first plate thru holes 676 are formed in the first plate 550. The example first plate 550 comprises six tapped holes and four thru holes 676. The first plate 550 further defines a first plate perimeter surface 678 defining a first plate configuration. As perhaps best shown in FIG. 15, the first plate configuration is round in the example first plate 550.

The second plate 552 of the plate assembly 540 comprises second plate curved surface 680 surrounding a second plate opening 682. A plurality of second plate thru holes 684 are formed in the second plate 552. The example second plate 552 comprises six thru holes 684. The second plate 552 further defines a second plate perimeter surface 688 defining a second plate configuration. The second plate configuration is round in the example second plate 552 as shown in FIG. 15.

The example first and second clip plates 560 and 562 are identical, but these clip plates 560 and 562 may differ in size, shape, and composition from each other and/or from what is depicted in the drawing depending upon the exact nature of the structural member being connected thereto. Because the example first and second clip plates 560 and 562 are identical, only the first clip plate 560 will be described in detail herein.

FIG. 16 illustrates that the example first clip plate 560 defines a first engaging surface 690, a second engaging surface 692, and an upper surface portion 694. The first and second engaging surfaces 690 and 692 are offset from each other to define a clip gap G. A plurality of thru holes 698 are formed in the example first clip plate 560 (FIG. 16). Three example thru holes 698 are formed in the example first clip plate 560.

The example core portion 520 and first interface portion 522 are assembled and connected together as follows.

Initially, the shaft portion 620 of the plug member 530 is passed through the second plate opening 682 of the second plate 552 such that the plug curved surface 632 faces the second plate curved surface 680. The curved surfaces 632 and 680 are sized and dimensioned such that the plug curved surface 632 cannot pass through the second plate opening 682.

The core portion 520 of the connecting assembly 420 is formed by first engaging the plug threaded surface 630 with the lock threaded surface 662 and axially rotating the plug member 530 and the lock member 534 relative to each other. At least initially, as shown in FIGS. 17 and 18, the lock member 534 will be displaced relative to the plug member 530. Next, the plug threaded surface 630 is engaged with the sleeve first threaded surface 650 and at least one of the plug member 530 and the sleeve member 532 is rotated relative to the other to displace the sleeve member 532 relative to the plug member 530. Typically, as shown in FIGS. 17 and 18, the sleeve member 532 will, at least initially, be displaced along the plug member 530 until the sleeve member 532 is in contact with the lock member 534.

At this point the second plate 552 is held between the sleeve member 532 and the head portion 622 of the plug member 530. However, the second plate 552 may move up and down and pivot within a limited range of movement relative to (both along and angularly with respect to) the system axis A.

The plate assembly 540 is then formed by arranging the first plate 550 such that the first plate curved surface 670 faces the plug curved surface 632 and such that at least some of the second plate thru holes 684 are aligned with the first plate tapped holes (not shown). The plate bolts 554 are then inserted through the second plate thru holes 684 and threaded into the corresponding first plate tapped holes (not shown).

At this point, further tightening of the plate bolts 554 draws the first and second plates 550 and 552 together such that the first plate curved surface 670 and the second plate curved surface 680 form an annular chamber 700 that surrounds at least a portion of the plug curved surface 632 and such that the plate assembly defines a plate or reference plane P at the interface of the first and second plates 550 and 552. Further, the curved surfaces 632, 670, and 680 are complementary such that, when the plate bolts 554 are not fully tightened, the head portion 622 of the plug member 530 form a ball joint that allows the plate assembly 540 to pivot such that the plate plane P moves through a range of angular orientations relative to the system axis A. However, fully tightening of the plate bolts 554 pulls the plate curved surfaces 670 and 680 against the plug curved surface 632 such that friction inhibits movement of the plate assembly 540 relative to the plug member 530 and thus allows the angular orientation of the plate plane P to be substantially fixed relative to the system axis A.

The clip assembly 542 is then formed first arranging each of the first and second clip plates 550 and 552 such that each of the clip plate thru holes 698 is aligned with a set of thru holes 676 and 684 in the first and second plates 550 and 552 respectively and tapped holes 674 in the first plate 550 and connected using the first and second clip bolt assemblies 564 and 566. A clip axis C is defined by the first and second clip plates 560 and 562.

The core portion 520 is secured to the second interface portion 524 as follows. Initially, the core sleeve 532 is arranged such that the longitudinal axis thereof is aligned with the longitudinal axis of the coupler member. The external threading of the sleeve second threaded surface 652 is then brought into contact with the internal threading of the coupler member. Axial rotation of the core sleeve 532 relative to the coupler member causes the sleeve second threaded surface 652 to engage the coupler first threaded surface. The core sleeve 532 and coupler member are axially rotated until a lower end 710 of the core sleeve 532 engages a stop projection of the coupler member and an annular surface of the coupler member overlaps a portion of the outer surface of the sleeve spacing portion 644.

With the core portion 520 secured to the first and second interface portions 522 and 524 as described above, the connecting assembly 420 is formed.

As generally described with reference to FIGS. 7-11 and discussed above, the second example connecting assembly 420 can be adjusted to accommodate an existing driven pile and a particular orientation of structural member.

FIGS. 17-19 illustrate that rotating the lock member 534 such that the lock member 534 is displaced along the axis A away from the sleeve 532 allows a distance between the sleeve 532 and the head portion 622 of the plug member 530 to be altered from a distance D1 in FIGS. 16 and 17 to a distance D2 in FIGS. 18 and 19. Rotating the lock member 534 such that the lock member 534 engages the sleeve 532 as shown in FIG. 19 inhibits movement of the sleeve 532 relative to the head portion 622 during normal use of the connecting assembly 420.

III. THIRD EXAMPLE CONNECTING SYSTEM

Figure 20:
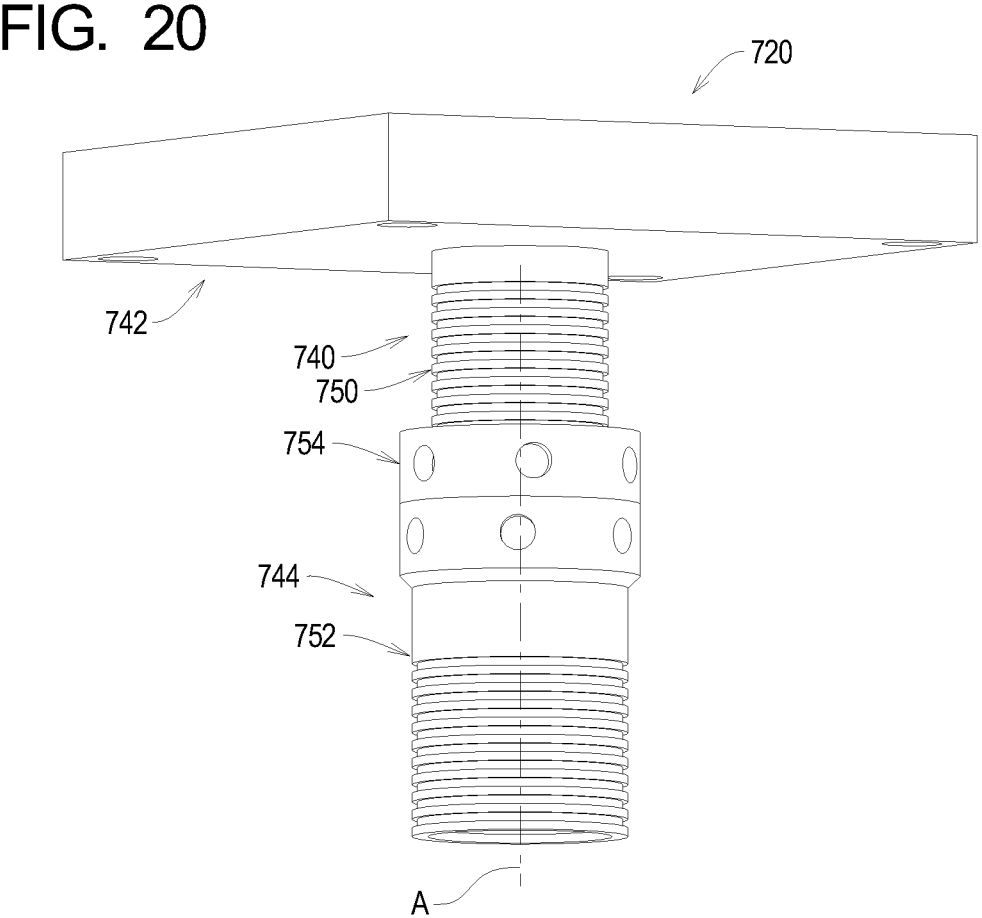
FIG. 20 is a bottom isometric view illustrating a third example connecting system of the present invention.
Figure 21:
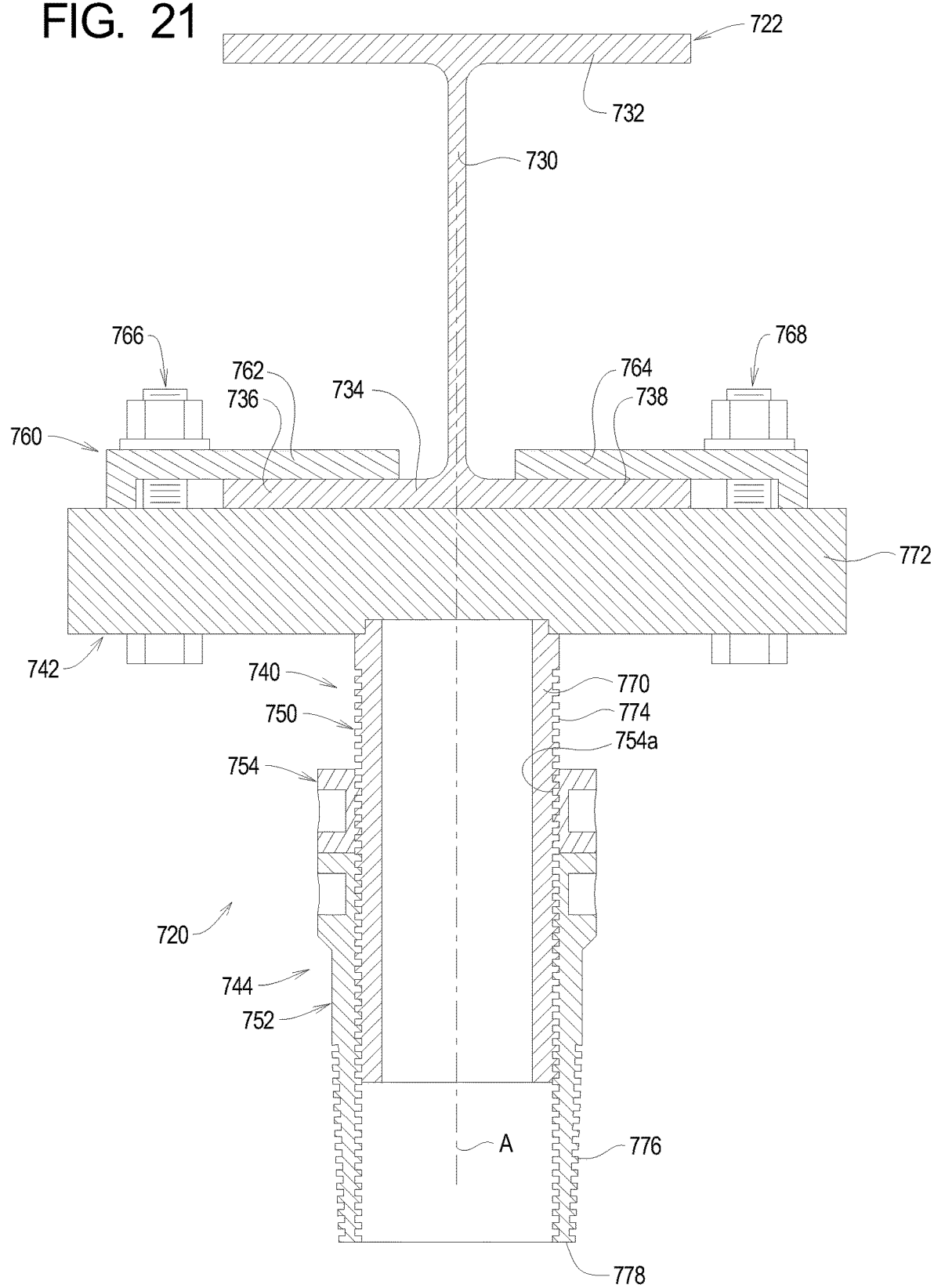
FIG. 21 is an end elevation cutaway view illustrating the second example connecting system connected to a structural member.
Figure 22:
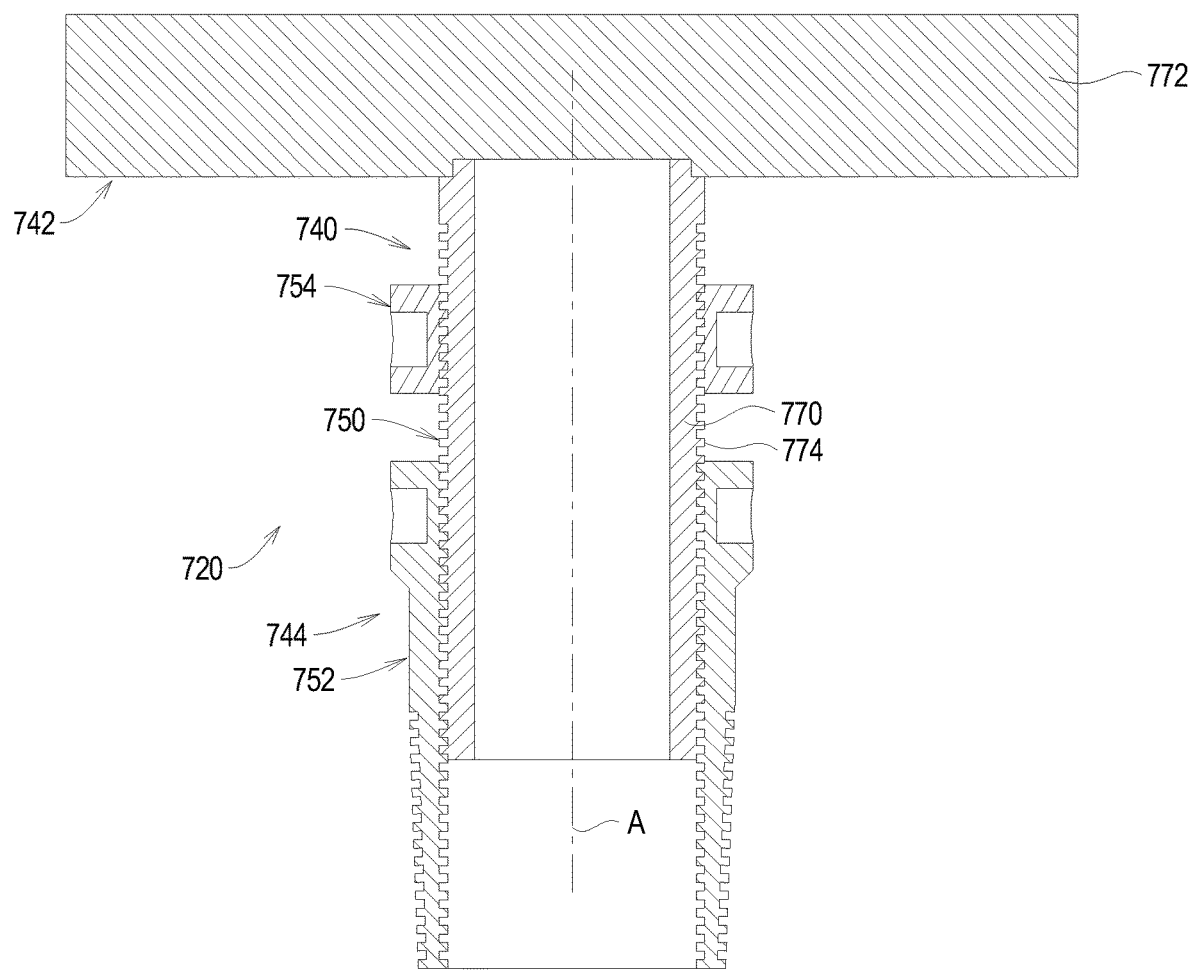
FIG. 22 is an end cutaway view similar to FIG. 21 illustrating a lock member in an unlocked position to allow an effective length of the second example connecting system to be adjusted.

Referring now to FIGS. 20-22 of the drawing, depicted therein is a third example connecting assembly 720 adapted to connect a structural member 722 to a pile, such as the pile 24 described above, that is supported in the earth. The structural member 722 and pile are not by themselves part of the present invention and thus will be described herein only to that extent helpful to a complete understanding of the present invention.

The example structural member 722 is or may be a conventional I-beam comprising a web 730, an upper flange 732, and a lower flange 734. In the example structural member 722, the lower flange comprises a first lateral portion 736 and a second lateral portion 738. Typically, a structural member such as the example structural member 722 is sized, dimensioned, and configured to span a distance and/or support a load (not shown) such as a pipe structure forming a part of a larger pipeline.

As with the example pile 24 described above, when the pile supporting the third example connecting assembly 720 is driven into the earth, an upper portion of the pile should be at or near a predetermined location in three-dimensional space above the earth as required by the design of the structure supported by the structural member 722.

The example connecting assembly 720 comprises a core portion 740, a first interface portion 742, and a second interface portion 744. As will be explained in detail below, the first interface portion 742 is configured to engage the structural member 722 and the core portion 740, and the second interface portion 744 is configured to engage the pile and the core portion 740. Further, the core portion 740 allows adjustment of the first interface portion 742 relative to the second interface portion 744 along a system axis A, an offset distance with respect to the system axis A, and at different radial locations about the system axis A.

The example core portion 740 comprises a plug member 750, a sleeve member 752, and a lock member 754. The first interface portion 742 comprises a clip assembly 760 comprising first and second clip plates 762 and 764, a plurality of first clip bolt assemblies 766, and a plurality of second clip bolt assemblies 768. The example second interface portion 744 comprises a coupler member (not shown) like the coupler member 170 described above. The example sleeve member 752 is or may be the same as the sleeve member 532 described above. The example lock member 754 is or may be the same as the example lock member 534. The example first and second clip plates 762 and 764 are or may be the same as the clip plates 560 and 562 described above. The example clip bolt assemblies 766 and 768 are or may be the same as the example clip bolt assemblies 564 and 566 described above. These components 752, 754, 762, 764, 766, and 766 will not be described again in detail.

The plug member 750 comprises a shaft portion 770 and a head portion 772. The shaft portion 770 is generally in the form of a hollow cylinder defining the system axis A and defines a plug threaded surface 774. The example head portion 772 is in the shape of a rectangular plate.

The example core portion 740 and first interface portion 742 are assembled together by passing the example first and second clip bolt assemblies 766 and 768 through the head portion 772 of the plug member 750 and through the first and second clip plates 762 and 764, respectively. At this point, the clip plates 762 and 764 may be securely attached to the head portion 772 with the lateral portions 736 and 738 of the lower flange 734 of the structural member 722 securely held between the clip plates 762 and 764 and the head portion 772 as depicted in FIG. 21.

The core portion 740 of the connecting assembly 720 is formed by first engaging the plug threaded surface 774 with an interior threaded surface 754a of the lock member 754 and axially rotating the plug member 750 and the lock member 754 relative to each other. Next, the plug threaded surface 774 is engaged with an interior threaded surface of the sleeve member 752, and at least one of the plug member 750 and the sleeve member 752 is rotated relative to the other to displace the sleeve member 752 relative to the plug member 750. Typically, the sleeve member 752 will, at least initially, be displaced along the plug member 750 until the sleeve member 752 is in contact with the lock member 754.

The core portion 740 is secured to the second interface portion 744 by arranging the core sleeve 752 such that the longitudinal axis thereof is aligned with the longitudinal axis of the coupler member. An external threaded surface 776 of the sleeve member 752 is then brought into contact with the internal threading of the coupler member. Axial rotation of the core sleeve 752 relative to the coupler member causes a second threaded surface of the core sleeve 752 to engage the coupler first threaded surface. The core sleeve 752 and coupler member are axially rotated until a lower end 778 of the core sleeve 752 engages a stop projection of the coupler member and an annular surface of the coupler member overlaps a portion of the outer surface of a spacing portion of the sleeve member 752. With the core portion 740 secured to the first and second interface portions 742 and 744 as described above, the connecting assembly 720 is formed.

As generally described with reference to FIGS. 7-11 and discussed above, the third example connecting assembly 720 can be adjusted to accommodate an existing driven pile and a particular orientation of structural member. In particular, rotating the lock member 754 such that the lock member 754 is displaced along the axis A away from the sleeve 752 allows a distance between the sleeve 752 and the head portion 772 of the plug member 750 to be altered as necessary for a particular pile as driven and particular structural member. By rotating the lock member 754 such that the lock member 754 engages the sleeve 752, movement of the sleeve 752 relative to the head portion 772 during normal use of the connecting assembly 720 is inhibited.

IV. FOURTH EXAMPLE CONNECTING SYSTEM

Referring now to FIGS. 23-28 of the drawing, depicted therein is a fourth example connecting assembly 820 adapted to connect a structural member 822 to a pile 824 (FIG. 24) that is supported in the earth. The structural member and pile are not by themselves part of the present invention and thus will be described herein only to that extent helpful to a complete understanding of the present invention.

Figure 23:
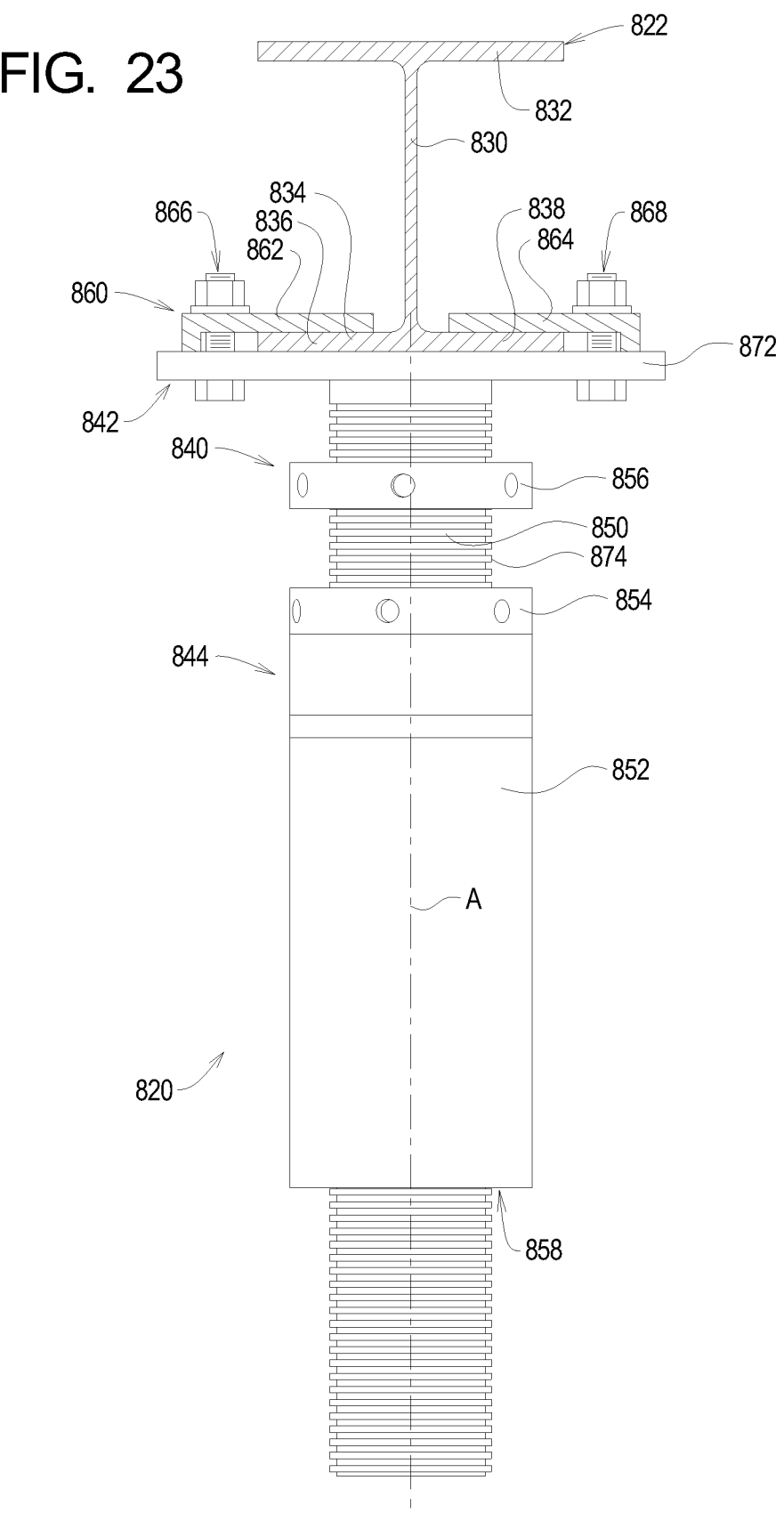
FIG. 23 is an end elevation view illustrating a fourth example connecting system of the present invention.

FIG. 23 illustrates that the example structural member 822 is or may be a conventional I-beam comprising a web 830, an upper flange 832, and a lower flange 834. In the example structural member 822, the lower flange comprises a first lateral portion 836 and a second lateral portion 838. Typically, a structural member such as the example structural member 822 is sized, dimensioned, and configured to span a distance and/or support a load (not shown) such as a pipe structure forming a part of a larger pipeline.

As with the example pile 24 described above, when the pile supporting the fourth example connecting assembly 820 is driven into the earth, an upper portion of the pile should be at or near a predetermined location in three-dimensional space above the earth as required by the design of the structure supported by the structural member 822.

Figure 24:
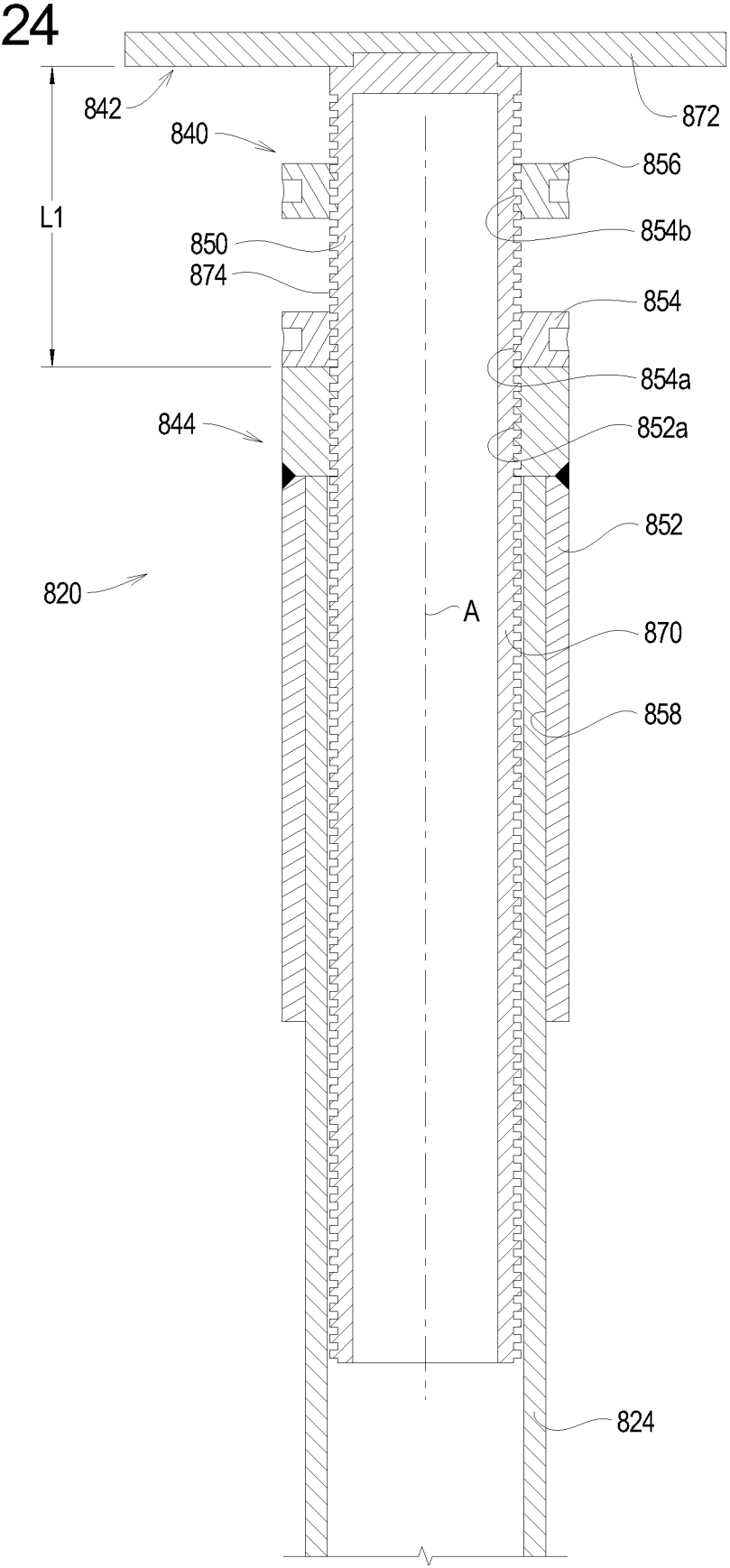
FIG. 24-28 are end cutaway views illustrating the process of adjusting an effective length of the fourth example connecting system.

FIGS. 23 and 24 of the drawing illustrates that the example connecting assembly 820 comprises a core portion 840, a first interface portion 842, and a second interface portion 844. As will be explained in detail below, the first interface portion 842 is configured to engage the structural member 822 and the core portion 840, and the second interface portion 844 is configured to engage the pile 824 and the core portion 840. Further, the core portion 840 allows adjustment of the first interface portion 842 relative to the second interface portion 844 along a system axis A, an offset distance with respect to the system axis A, and at different radial locations about the system axis A.

The example core portion 840 comprises a plug member 850, a sleeve member 852, a first lock member 854, and a second lock member 856. The example connecting assembly 820 may use a sleeve member that is the same as the sleeve member 532 described above, but the example sleeve member 852 is an elongate hollow member that defines an elongate, annular pile chamber 858 for receiving the pile 824. The pile chamber 858 forms the second interface portion 844 of the fourth example connecting assembly 820. The example first and second lock members 854 and 856 are or may be the same as the example first lock member 534. The lock members 854 and 856 will not be described again in detail.

The first interface portion 842 comprises a clip assembly 860 comprising first and second clip plates 862 and 864, a plurality of first clip bolt assemblies 866, and a plurality of second clip bolt assemblies 868. The example first and second clip plates 862 and 864 are or may be the same as the clip plates 560 and 562 described above. The example clip bolt assemblies 866 and 868 are or may be the same as the example clip bolt assemblies 564 and 566 described above. These components 862, 864, 866, and 868 will not be described again in detail.

The plug member 850 comprises a shaft portion 870 and a head portion 872. The shaft portion 870 is generally in the form of a hollow cylinder defining the system axis A and defines a plug threaded surface 874. The example head portion 872 is in the shape of a rectangular plate.

The example core portion 840 and first interface portion 842 are assembled together by passing the example first and second clip bolt assemblies 866 and 868 through the head portion 872 of the plug member 850 and through the first and second clip plates 862 and 864, respectively. At this point, the clip plates 862 and 864 may be securely attached to the head portion 872 with the lateral portions 836 and 838 of the lower flange 834 of the structural member 822 securely held between the clip plates 862 and 864 and the head portion 872 as depicted in FIG. 23.

The core portion 840 of the connecting assembly 820 is formed by first engaging the plug threaded surface 874 with first and second lock threaded surfaces 854a and 854b of the first and second lock members 854 and 856 and axially rotating the plug member 850 and the first and second lock member 854 and 856 relative to each other. Next, the plug threaded surface 874 is engaged with an internal sleeve threaded surface 852a of the sleeve member 852, and at least one of the plug member 850 and the sleeve member 852 is rotated to thread plug member 850 into the sleeve member 852.

As generally described with reference to FIGS. 8-11 and discussed above, the fourth example connecting assembly 820 can be adjusted to accommodate an existing driven pile and a particular orientation of structural member.

In particular, with the example connecting assembly 820 is in the configuration depicted in FIG. 24, an effective length of the example connecting assembly 820 is L1. At this point, the first lock member 854 is engaged with the sleeve member 852 to lock a position of the plug member 850 relative to the sleeve member 852 during normal use of the example connecting assembly 820. Further, the second lock member 856 is disengaged from both the first lock member 854 and the upper end of the shaft portion 870 of the plug member 850.

Figure 25:
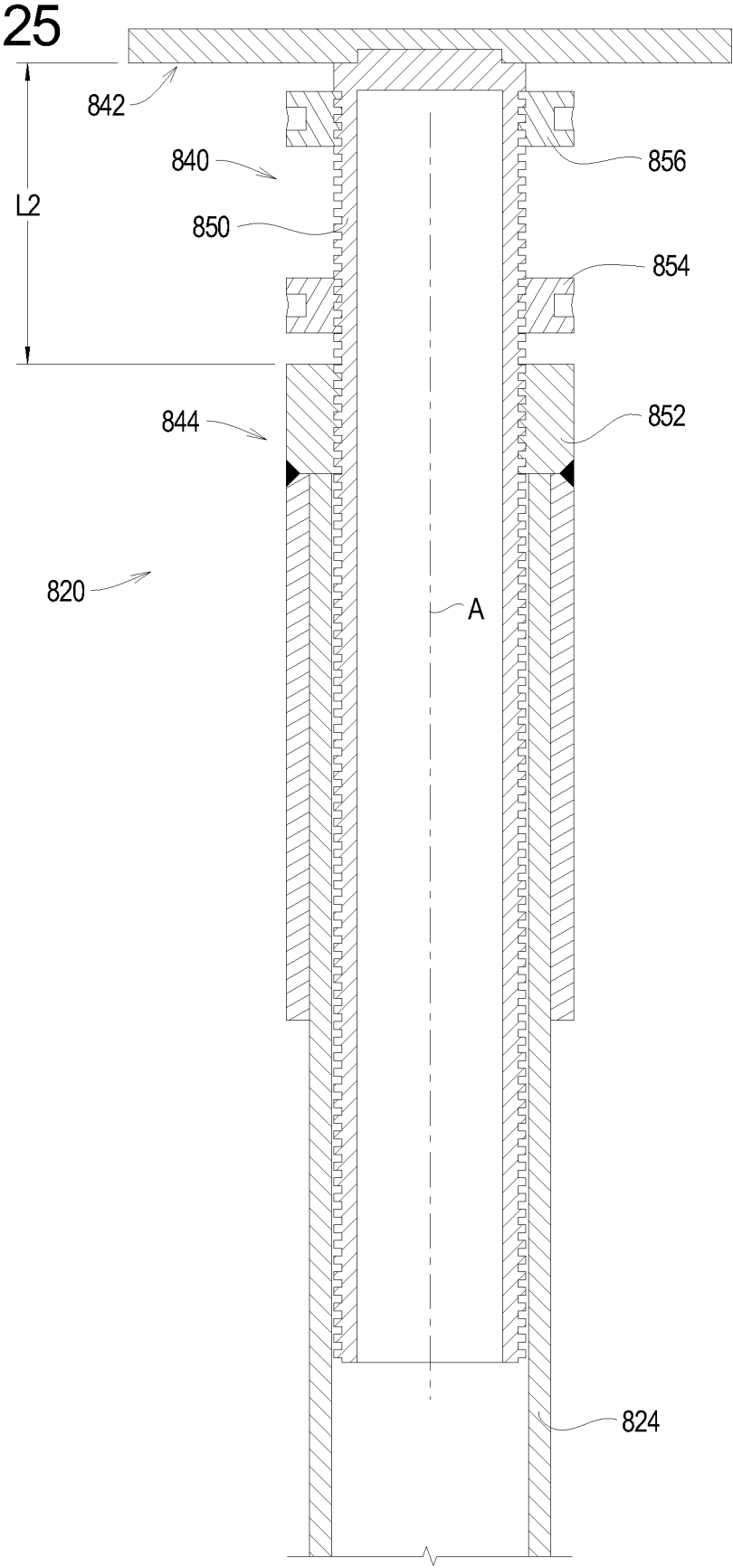

Between the configuration depicted in FIG. 24 and the configuration depicted in FIG. 25, the second lock member 856 has been rotated such that the second lock member 856 has engaged the upper end of the shaft portion 870 and then rotated further to rotate the plug member 850 about the axis A, thereby increasing the effective length of the example connecting assembly 820 to a length L2. At this point, the first lock member 854 has disengaged from the sleeve member 852. Continued rotation of the second lock member 856 further rotates the plug member 850 about the axis A, thereby increasing the effective length of the example connecting assembly 820 to a length L3 as shown in FIG. 26.

Figure 26:
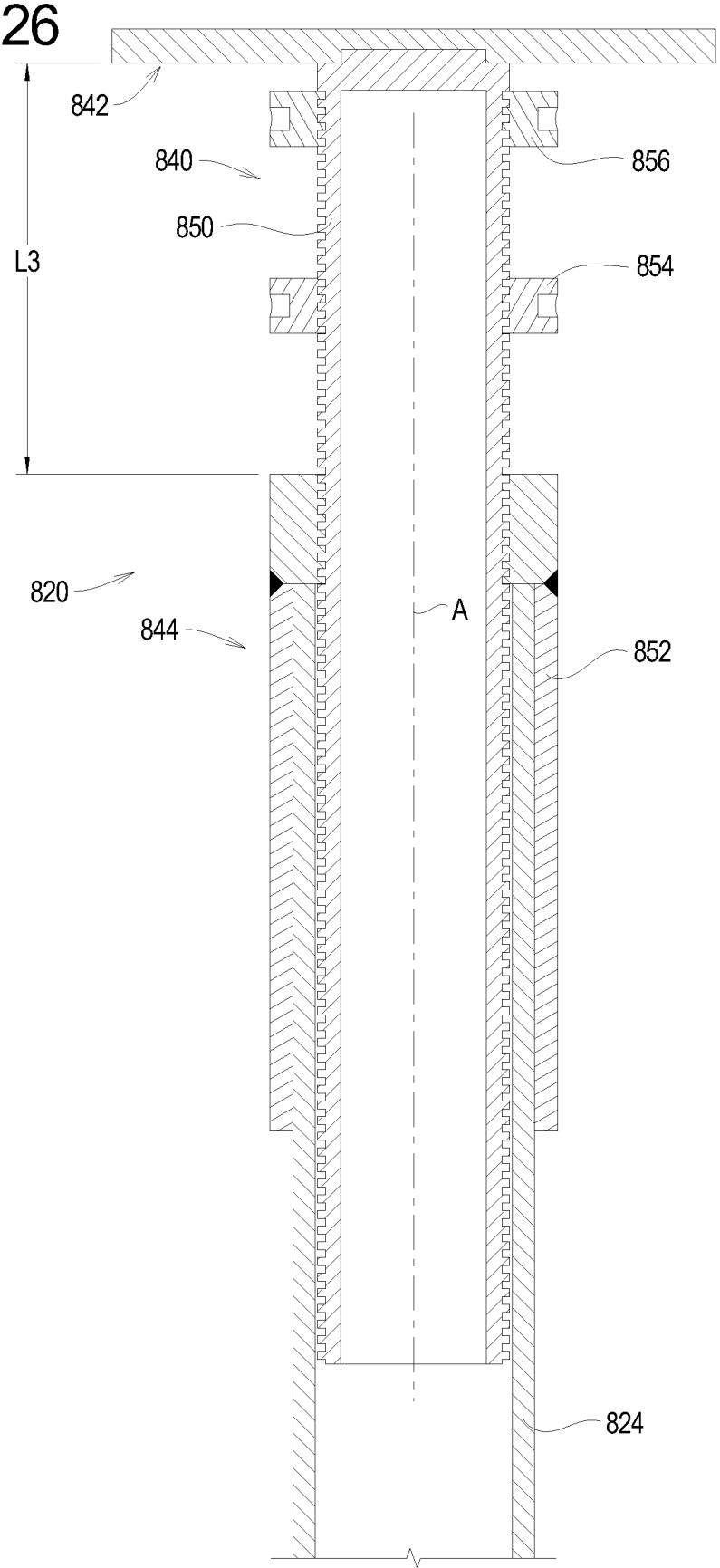
Figure 27:
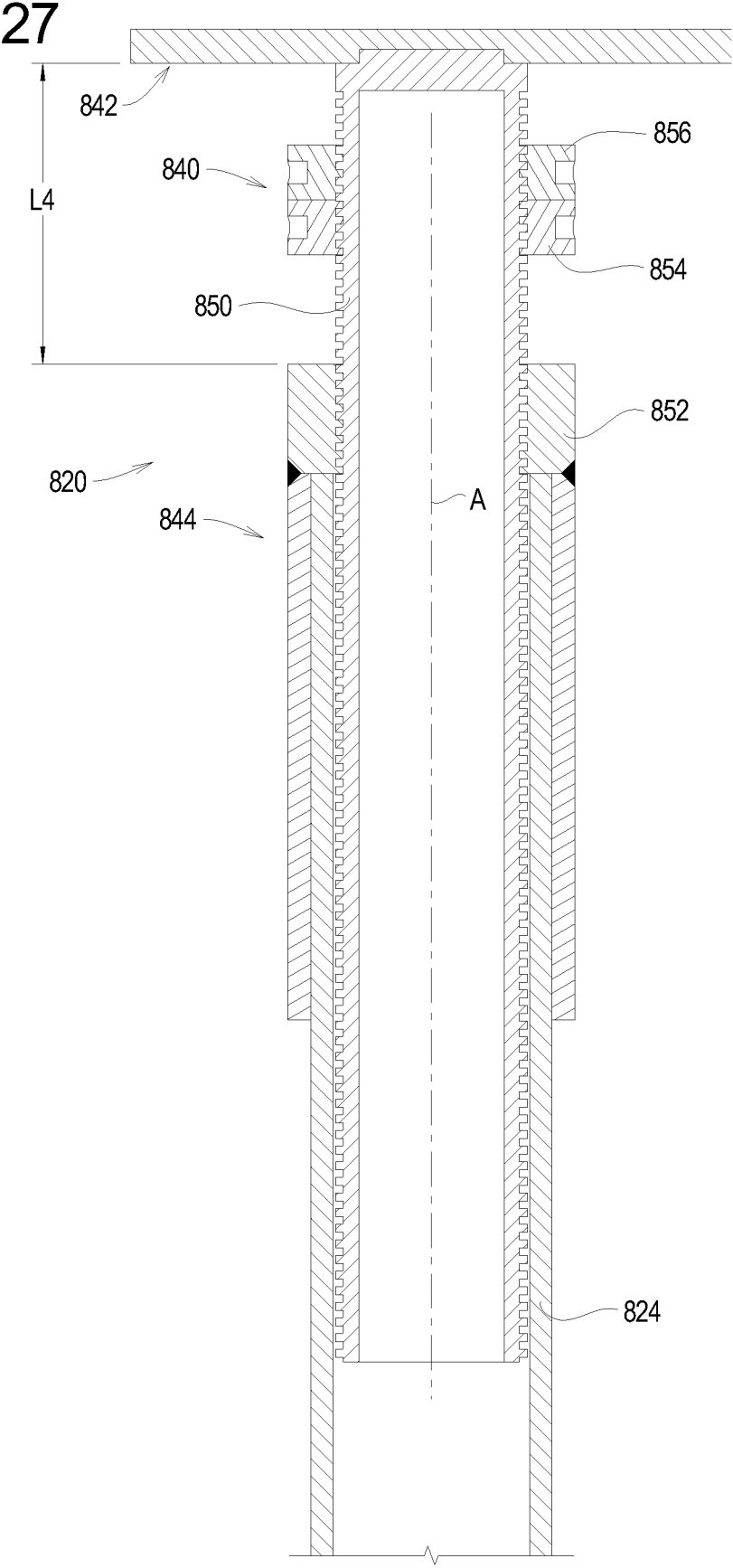
Figure 28:
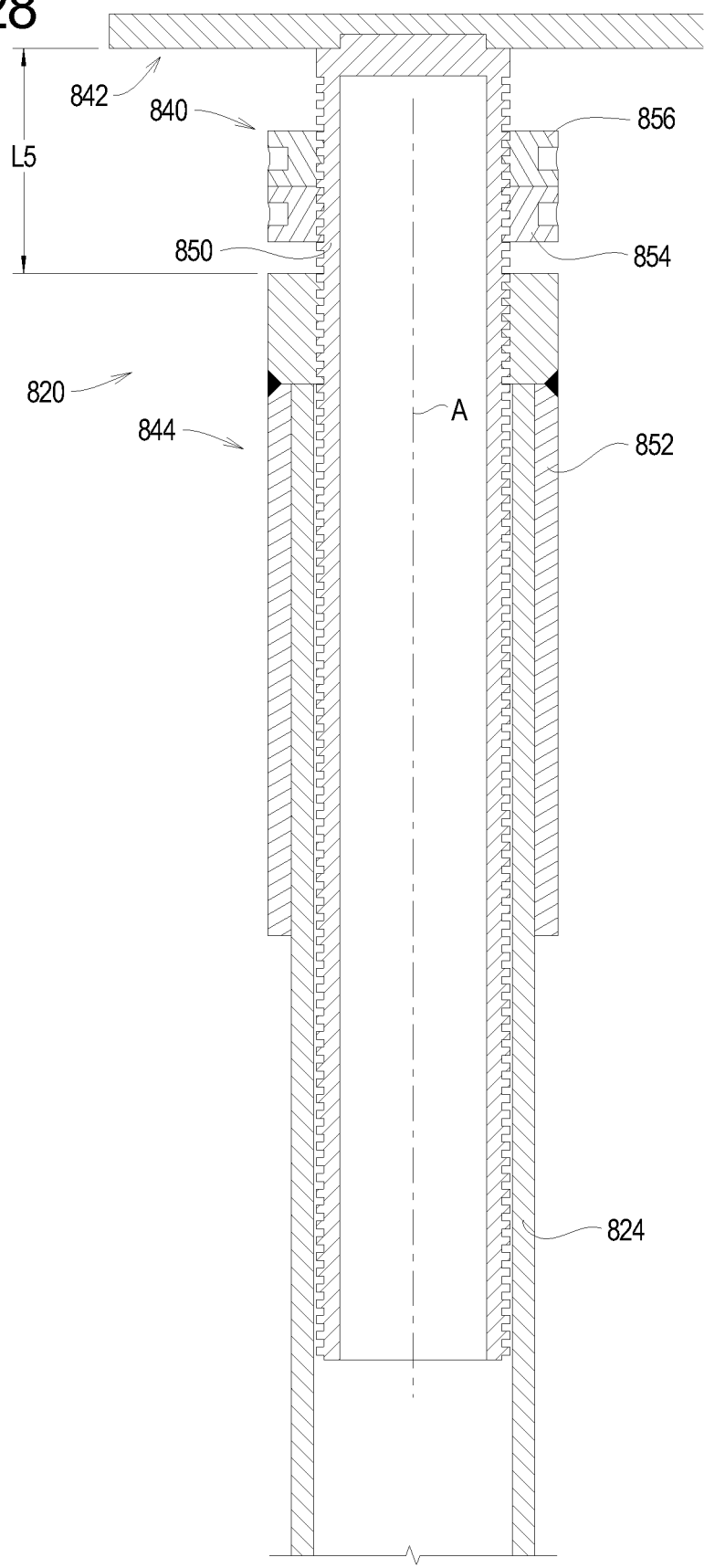

Between the configuration depicted in FIG. 26 and the configuration depicted in FIG. 27, the second lock member 856 has been rotated such that the second lock member 856 has engaged the first lock member 854 and rotated further to rotate the plug member 850 about the axis A, thereby decreasing the effective length of the example connecting assembly 820 to a length L4. Continued rotation of the second lock member 856 further rotates the plug member 850 about the axis A, thereby decreasing the effective length of the example connecting assembly 820 to a length L5 (FIG. 28).

The first and second lock members 854 and 856 may thus be used to alter an effective length of the example connecting assembly 820 without directly engaging the plug member 850.

Once the effective length of the example connecting assembly 820 is at a desired length, the first lock member 854 is rotated until the first lock member 854 engages the sleeve member 852, thereby inhibiting rotation of the sleeve member 852 about the axis A. The second lock member 856 may then be rotated until the second lock member 854 engages the first lock member 854, thereby inhibiting rotation of the first lock member 854, and also of the sleeve member 852, about the axis A.

V. SUMMARY

Certain elements of one or more of the first, second, third, and fourth example connecting assemblies 20, 420, 720, and 820 described herein may be applied to the other example connecting assemblies 20, 420, 720, and/or 820. For example, the use of first and second lock members as in the fourth example connecting assembly 820 may be applied to any of the other example connecting assemblies 20, 420, and/or 720. Similarly, the use of an elongate, annular pile chamber to as a second interface portion to engage a pile as in the fourth example connecting assembly 820 may be applied to any of the other example connecting assemblies 20, 420, and/or 720. Similarly, the use of complementary circular or spherical surfaces to allow pivoting, rotating movement of a plate or plate assembly relative to a system axis A as in the first and second example connecting assembly 20 and 420 may be applied to any of the other example connecting assemblies 720 and/or 820.

In addition, while the example pile the first example connecting assembly 20 is a pile that is augered into the earth, other pile configurations may be used in addition or instead with any of the first, second, third, and fourth example connecting assemblies 20, 420, 720, and 820. Further, while the example structural members supported by the first, second, third, and fourth example connecting assemblies 20, 420, 720, and 820 are I-beams, other configurations of structural members may be supported by a connecting system or assembly of the present invention.

The present specification is thus intended to cover any combinations and sub-combinations of elements from any one or more of the first, second, third, and fourth example connecting assemblies 20, 420, 720, and 820 with any other of the first, second, third, and fourth example connecting assemblies 20, 420, 720, and/or 820.

What is claimed is:
1. A pile system comprising:
 a structural member;
 a pile defining a pile engaging surface; and
 a connecting system comprising
  a plug member defining a system axis, where the plug member defines
   a plug curved surface, and
   a plug engaging surface;
  a plate assembly defining a reference plane, where the plate assembly is movable relative to the system axis and comprises
   a first plate defining a first plate curved surface, and
   a second plate defining a second plate curved surface,
  at least one clip member;
  a sleeve member defining a first sleeve engaging surface and a second sleeve engaging surface; and
  a lock member defining a lock member engaging surface; wherein
 the first sleeve engaging surface engages the pile engaging surface to support the sleeve member relative to the pile;
 the second sleeve engaging surface engages the plug engaging surface to support the plug member relative to the sleeve member;
 the lock member engaging surface engages the plug engaging surface such that the lock member fixes a position of the plug member relative to the sleeve member;
 the first plate curved surface and second plate curved surface engage the plug curved surface to fix an orientation of the plate assembly relative to the plug member; and the at least one clip member engages the structural member to fix a location of the structural member relative to the plate assembly.

2. The pile system as recited in claim 1, in which:
the pile engaging surface is threaded;
the first sleeve engaging surface is threaded; and
the first sleeve engaging surface threads onto the pile threaded surface to support the sleeve member relative to the pile.

3. The pile system as recited in claim 1, in which:
the second sleeve engaging surface is threaded;
the plug engaging surface is threaded; and
the second sleeve engaging surface threads onto the plug engaging surface to support the plug member relative to the sleeve member.

4. The pile system as recited in claim 1, in which:
the lock member engaging surface is threaded; and
the lock member engaging surface threads onto the plug engaging surface to fix a position of the plug member relative to the sleeve member.

5. The pile system as recited in claim 1, in which the connecting system comprises a plurality of clip members.

6. The pile system as recited in claim 1, in which the connecting system comprises at least one clip bolt configured to secure the at least one clip member relative to the first plate member.

7. The pile system as recited in claim 1, in which the connecting system comprises at least one clip bolt configured to secure the at least one clip member relative to the first plate member and the first plate member relative to the second plate member.

8. The pile system as recited in claim 1, in which:
the pile engaging surface is threaded;
the first sleeve engaging surface is threaded;
the second sleeve engaging surface is threaded;
the plug engaging surface is threaded;
the lock member engaging surface is threaded;
the first sleeve engaging surface threads onto the pile threaded surface to support the sleeve member relative to the pile;
the second sleeve engaging surface threads onto the plug engaging surface to support the plug member relative to the sleeve member; and
the lock member engaging surface threads onto the plug engaging surface to fix a position of the plug member relative to the sleeve member.

9. The pile system as recited in claim 8, in which the connecting system comprises a plurality of clip members.

10. The pile system as recited in claim 8, in which the connecting system comprises at least one clip bolt configured to secure the at least one clip member relative to the first plate member.

11. The pile system as recited in claim 8, in which the connecting system comprises at least one clip bolt configured to secure the at least one clip member relative to the first plate member and the first plate member relative to the second plate member.

12. A connecting system for connecting a structural member to a pile defining a pile engaging surface, comprising:
a connecting system comprising
a plug member defining a system axis, where the plug member comprises
a head portion, and
a plug engaging surface;
at least one clip member;
a sleeve member defining a first sleeve engaging surface and a second sleeve engaging surface; and
a lock member defining a lock member engaging surface; wherein
the first sleeve engaging surface engages the pile engaging surface to support the sleeve member relative to the pile;
the second sleeve engaging surface engages the plug engaging surface to support the plug member relative to the sleeve member;
the lock member engaging surface engages the plug engaging surface such that the lock member fixes a position of the plug member relative to the sleeve member; and
the at least one clip member engages the structural member to fix a location of the structural member relative to the plate assembly.

13. The pile system as recited in claim 12, in which:
the pile engaging surface is threaded;
the first sleeve engaging surface is threaded; and
the first sleeve engaging surface threads onto the pile threaded surface to support the sleeve member relative to the pile.

14. The pile system as recited in claim 12, in which:
the second sleeve engaging surface is threaded;
the plug engaging surface is threaded; and
the second sleeve engaging surface threads onto the plug engaging surface to support the plug member relative to the sleeve member.

15. The pile system as recited in claim 12, in which:
the lock member engaging surface is threaded; and
the lock member engaging surface threads onto the plug engaging surface to fix a position of the plug member relative to the sleeve member.

16. The pile system as recited in claim 12, in which the connecting system comprises a plurality of clip members.

17. The pile system as recited in claim 12, in which the connecting system comprises at least one clip bolt configured to secure the at least one clip member relative to the head portion of the plug member.

18. The pile system as recited in claim 12, in which:
the pile engaging surface is threaded;
the first sleeve engaging surface is threaded;
the second sleeve engaging surface is threaded;
the plug engaging surface is threaded;
the lock member engaging surface is threaded;
the first sleeve engaging surface threads onto the pile threaded surface to support the sleeve member relative to the pile;
the second sleeve engaging surface threads onto the plug engaging surface to support the plug member relative to the sleeve member; and
the lock member engaging surface threads onto the plug engaging surface to fix a position of the plug member relative to the sleeve member.

19. The pile system as recited in claim 18, in which the connecting system comprises a plurality of clip members.

20. The pile system as recited in claim 18, in which the connecting system comprises at least one clip bolt configured to secure the at least one clip member relative to the head portion of the plug member.

21. A method of connecting a structural member to a pile defining a pile engaging surface comprising the steps of:
providing a plug member defining a system axis, where the plug member comprises
a head portion, and
a plug engaging surface;
providing at least one clip member;

providing a sleeve member defining a first sleeve engaging surface and a second sleeve engaging surface; and
providing a lock member defining a lock member engaging surface;
engaging the first sleeve engaging surface with the pile engaging surface to support the sleeve member relative to the pile;
engaging the second sleeve engaging surface with the plug engaging surface to support the plug member relative to the sleeve member;
engaging the lock member engaging surface with the plug engaging surface such that the lock member fixes a position of the plug member relative to the sleeve member; and
engaging the at least one clip member with the structural member to fix a location of the structural member relative to the head portion of the plug member.

22. The method as recited in claim 21, in which:
the pile engaging surface is threaded;
the first sleeve engaging surface is threaded;
the second sleeve engaging surface is threaded;
the plug engaging surface is threaded;
the lock member engaging surface is threaded;
the method further comprising the steps of
threading the first sleeve engaging surface onto the pile threaded surface to support the sleeve member relative to the pile;
threading the second sleeve engaging surface onto the plug engaging surface to support the plug member relative to the sleeve member; and
threading the lock member engaging surface onto the plug engaging surface to fix a position of the plug member relative to the sleeve member.

* * * * *